(12) United States Patent
Petrik et al.

(10) Patent No.: US 9,323,495 B2
(45) Date of Patent: Apr. 26, 2016

(54) DISPLAY, CLIENT COMPUTER DEVICE AND METHOD FOR DISPLAYING A MOVING OBJECT

(71) Applicants: Sony Corporation, Tokyo (JP); Sony Europe Limited, Weybridge (GB)

(72) Inventors: Slavomir Petrik, Brussels (BE); Juan Bernabeu, Auderghem (BE); Pascal Piquepe, Hoeilaart (BE)

(73) Assignees: Sony Corporation, Tokyo (JP); Sony Europe Limited, Weybridge (GB)

( * ) Notice: Subject to any disclaimer, the term of this patent is extended or adjusted under 35 U.S.C. 154(b) by 334 days.

(21) Appl. No.: 13/790,529

(22) Filed: Mar. 8, 2013

(65) Prior Publication Data

US 2013/0241801 A1 Sep. 19, 2013

(30) Foreign Application Priority Data

Mar. 16, 2012 (EP) ..................................... 12159994

(51) Int. Cl.
*G06F 3/14* (2006.01)
*G09G 5/14* (2006.01)

(52) U.S. Cl.
CPC ............ *G06F 3/1423* (2013.01); *G06F 3/1446* (2013.01); *G06F 3/1454* (2013.01); *G09G 5/14* (2013.01); *G09G 2356/00* (2013.01); *G09G 2370/04* (2013.01)

(58) Field of Classification Search
None
See application file for complete search history.

(56) References Cited

U.S. PATENT DOCUMENTS 6,392,675 B1 * 5/2002 Becker et al. ................. 715/858
6,573,913 B1 * 6/2003 Butler et al. .................. 715/761

(Continued)

FOREIGN PATENT DOCUMENTS

JP 2008-96756 4/2008

OTHER PUBLICATIONS iDisplay—Android Apps auf Google Play, https://play.google.com/store/apps/details?id=com.idisplay.virtualscreen, Jan. 2, 2013, 5 pages.

(Continued)

*Primary Examiner* — Antonio Xavier
(74) *Attorney, Agent, or Firm* — Oblon, McClelland, Maier & Neustadt, L.L.P.

(57) ABSTRACT

A display apparatus for displaying a moving object traversing a virtual display region comprises two or more client computer devices each being configured to display a respective portion of the virtual display region, in which each respective portion is defined by a set of edges, each edge being classified as a hard edge, from which the moving object is reflected, or a soft edge through which the moving object is allowed to pass; and a path controller, associated with each client computer device, for defining a path of the moving object with respect to the portion of the virtual display region which is displayed by that client computer device; the path controller being configured, when the path controller defines a path which intersects a soft edge of that client computer device's portion of the virtual display region, to transmit data defining the path of the moving object for use at least by another client computer device which displays the next portion of the virtual display region which will lie within the detected path of the moving object.

16 Claims, 17 Drawing Sheets

(56) References Cited

U.S. PATENT DOCUMENTS

| | | | |
|---|---|---|---|
| 6,795,055 B1* | 9/2004 | Culler | 345/157 |
| 7,227,510 B2* | 6/2007 | Mayer et al. | 345/1.1 |
| 7,761,811 B1* | 7/2010 | Chaudhri | 715/835 |
| 2003/0151588 A1* | 8/2003 | Rensberger | 345/156 |
| 2006/0033712 A1* | 2/2006 | Baudisch et al. | G06F 3/038 345/157 |
| 2007/0073873 A1* | 3/2007 | Levy et al. | 709/224 |
| 2007/0126748 A1* | 6/2007 | Jeffrey et al. | 345/559 |
| 2007/0198706 A1* | 8/2007 | Mechelli et al. | 709/224 |
| 2007/0296643 A1* | 12/2007 | Ben-Shachar et al. | 345/1.1 |
| 2008/0049743 A1* | 2/2008 | Zampetti | 370/389 |
| 2008/0095068 A1* | 4/2008 | Uysal | 370/252 |
| 2009/0027302 A1* | 1/2009 | Li | 345/1.1 |
| 2009/0153475 A1* | 6/2009 | Kerr et al. | 345/157 |
| 2009/0295833 A1* | 12/2009 | Kim | 345/660 |
| 2010/0030844 A1* | 2/2010 | Miyama et al. | 709/203 |
| 2010/0030850 A1* | 2/2010 | Onjo | 709/203 |
| 2010/0111491 A1* | 5/2010 | Kamoto | 386/66 |
| 2010/0125819 A1* | 5/2010 | Sudhakar | 715/867 |
| 2010/0194753 A1* | 8/2010 | Robotham et al. | 345/428 |
| 2010/0302129 A1* | 12/2010 | Kastrup | 345/1.3 |
| 2010/0328447 A1 | 12/2010 | Watson | |
| 2012/0235924 A1* | 9/2012 | Hochmuth et al. | 345/173 |
| 2013/0050260 A1* | 2/2013 | Reitan | 345/633 |

OTHER PUBLICATIONS

3D Virtual Worlds List, http://arianeb.com/more3Dworlds.htm, Jan. 2, 2013, 15 pages.

BZSQ-VW3D (BZSQVW3D): Product Overview: Sony Professional, http://www.pro.sony.eu/pro/lang/en/lu/product/videowalls/bzsq-vw3d/overview, Jan. 2, 2013, 1 page.

"ArraySync Client", Mac App Store—ArraySync Client, http://itunes.apple.com/in/app/arraysync-client/id415935969?mt=12, Feb. 1, 2012, 2 pages.

Extended Search Report issued Jun. 20, 2013 in European Patent Application No. 13153341.6.

\* cited by examiner

| Scene | Edge | H/S | Next scene |
|---|---|---|---|
| 870 | 880 | 890 | 900 |
|  |  |  |  |
|  |  |  |  |
|  |  |  |  |
|  |  |  |  |

DISPLAY, CLIENT COMPUTER DEVICE AND METHOD FOR DISPLAYING A MOVING OBJECT

FIELD OF THE DISCLOSURE

This disclosure relates to displays. Typically, a computer, mobile telephone, tablet computer or the like has a single associated display screen.

DESCRIPTION OF THE RELATED ART

In the case of some types of computer, the device's display can be implemented by two or more separate physical display devices, generally driven by the same graphics processor so as to represent respective portions of a single "canvas" or virtual display region that is larger, in terms of pixel size, than either individual physical display device. This arrangement is sometimes provided on desktop computers to allow a larger active display area than can be operated with just one physical display device. In the case of portable computers, the arrangement is sometimes used to map part of the canvas to a local display screen (perhaps forming part of the portable computer) while mapping the other part of the canvas to a video projector.

Other techniques have been proposed which allow multiple physical devices to represent portions of a larger canvas.

SUMMARY

This disclosure provides a display apparatus for displaying a moving object traversing a virtual display region, the apparatus comprising:

two or more client computer devices each being configured to display a respective portion of the virtual display region, in which each respective portion is defined by a set of edges, each edge being classified as a hard edge, from which the moving object is reflected, or a soft edge through which the moving object is allowed to pass; and a path controller, associated with each client computer device, for defining a path of the moving object with respect to the portion of the virtual display region which is displayed by that client computer device;

the path controller being configured, when the path controller defines a path which intersects a soft edge of that client computer device's portion of the virtual display region, to transmit data defining the path of the moving object for use at least by another client computer device which displays the next portion of the virtual display region which will lie within the detected path of the moving object. According to a further aspect, the disclosure provides a client computer device for using in a display apparatus for displaying a moving object traversing a virtual display region and having two or more client computer devices each being configured to display a respective portion of the virtual display region, in which each respective portion is defined by a set of edges, each edge being classified as a hard edge, from which the moving object is reflected, or a soft edge through which the moving object is allowed to pass. The client computer device comprises:

a path controller, associated with each client computer device, for defining a path of the moving object with respect to the portion of the virtual display region which is displayed by that client computer device;

the path controller being configured, when the path controller defines a path which intersects a soft edge of that client computer device's portion of the virtual display region, to transmit data defining the path of the moving object for use at least by another client computer device which displays the next portion of the virtual display region which will lie within the detected path of the moving object.

According to a still further aspect, the disclosure provides a method of displaying a moving object traversing a virtual display region using two or more client computer devices each being configured to display a respective portion of the virtual display region, in which each respective portion is defined by a set of edges, each edge being classified as a hard edge, from which the moving object is reflected, or a soft edge through which the moving object is allowed to pass, the method comprising:

each client computer device defining a path of the moving object with respect to the portion of the virtual display region which is displayed by that client computer device;

when a path is defined which intersects a soft edge of that client computer device's portion of the virtual display region, transmitting data defining the path of the moving object for use at least by another client computer device which displays the next portion of the virtual display region which will lie within the detected path of the moving object.

BRIEF DESCRIPTION OF THE DRAWINGS

Embodiments of the disclosure will now be described, by way of example only, with reference to the accompanying drawings in which.

DETAILED DESCRIPTION

Figure 1:
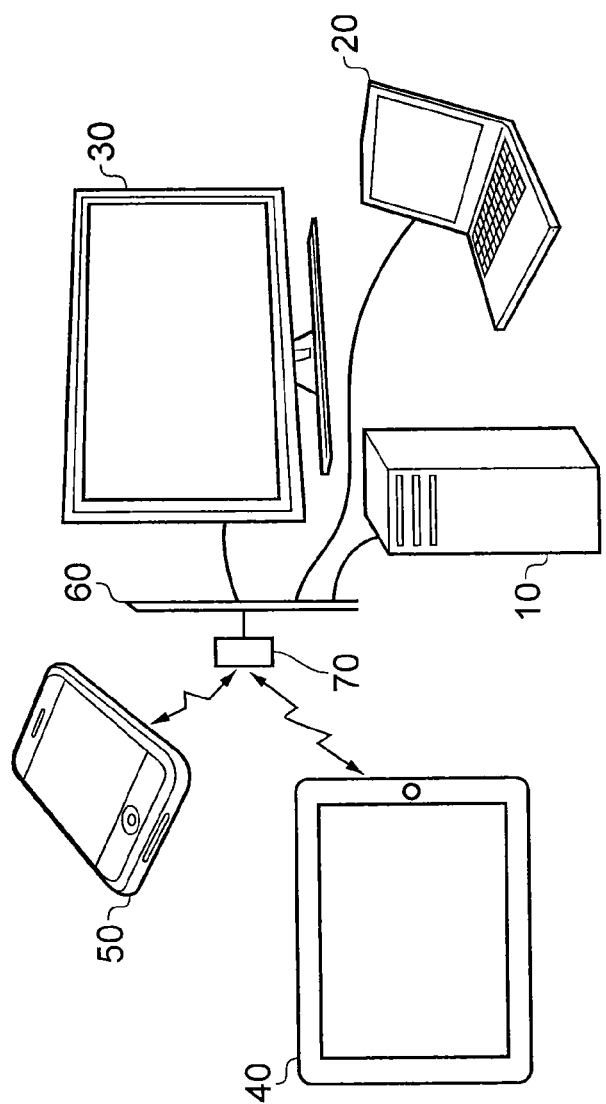
FIG. 1 schematically illustrates a network of devices.

FIG. 1 schematically illustrates an example of a network of devices acting as a display apparatus for displaying a moving object traversing a virtual display region (a virtual canvas), comprising a server 10, a laptop or notebook computer 20, a television display 30, a tablet computer 40 and a mobile telephone 50. The devices are interconnected for the purposes of transferring data between them by a network 60 such as an Ethernet network. The server 10, the laptop computer 20 and the television display 30 are connected by wired connections to the network 60. The tablet computer 40 and the mobile telephone 50 are connected by wireless connections such as so-called Wi-Fi connections, made via a wireless access point 70 which in turn is wired to the network 60. The skilled person will appreciate that the function of a wired or wireless connection to a network of this type is substantially identical in both cases; from the point of view of the operation of the individual devices with respect to the network, there is little or no technical difference between a wired and a wireless connection.

The function of the server 10 can be fulfilled by one of the other devices, such as the laptop computer 20. In such a case, a separate server is not required.

In the present embodiments, the devices are interconnected for the purposes of providing a multi-screen composite display. Such an arrangement is illustrated schematically in FIG. 2, which shows four of the devices arranged side-by-side in a row. A displayed object 80, in this case a company logo, follows a path 90 across each of the devices in turn, from the mobile telephone 50 to the television display 30 in this example. The path 90 need not be displayed; it is drawn in FIG. 2 simply to assist with the illustration. The significant part of the arrangement is that the displayed object 80 moves from screen to screen so as to follow the effective path 90. The path need not be straight; it could be curved for example.

Figure 2:
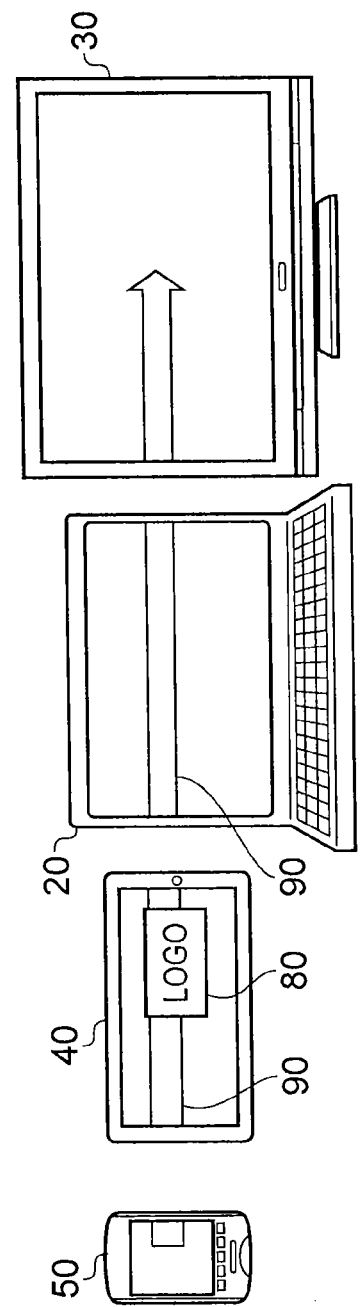
FIG. 2 schematically illustrates a multi-screen display.

One possible use of the multi-screen display of the type shown in FIG. 2 is to encourage purchase by a user of a suite of devices from the same manufacturer, by demonstrating the close interaction and compatibility of the separate devices. Another possible use is to allow a canvas formed of multiple displays to be used to display a moving object without having to pre-produce and transmit the content to be displayed to each client device or individual display; instead, each client device can react to user input influencing the content for display to modify or generate content (such as locally produced photographs) and send such content to other client devices or constituent displays making up the canvas. For example, this could allow different users to work with virtually adjacent displays forming part of an overall virtual canvas and to share information by sending the information through an interface between two such virtually adjacent displays.

Figure 3:
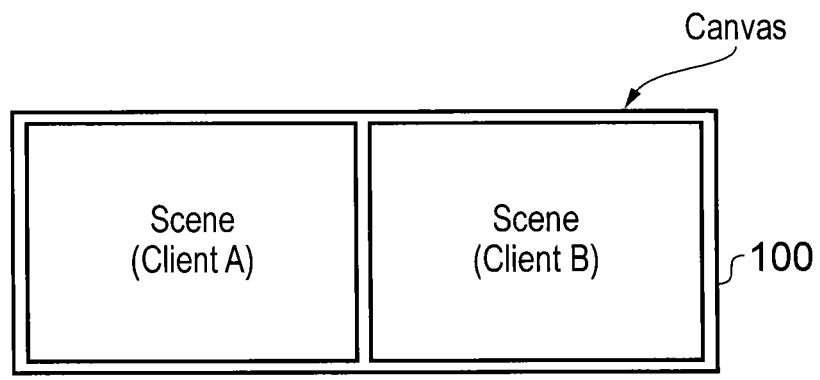
FIG. 3 schematically illustrates a virtual canvas formed by two separate adjacently positioned client displays.

FIG. 3 schematically illustrates a virtual canvas formed by two separate adjacently positioned client displays. The canvas 100 is at least as large as the sum of the display sizes or "scenes" of the constituent client devices. Techniques will be described below which allow objects, and in particular animations, to be displayed across the whole of a canvas even though the canvas is formed of two or more such scenes.

Figure 4:
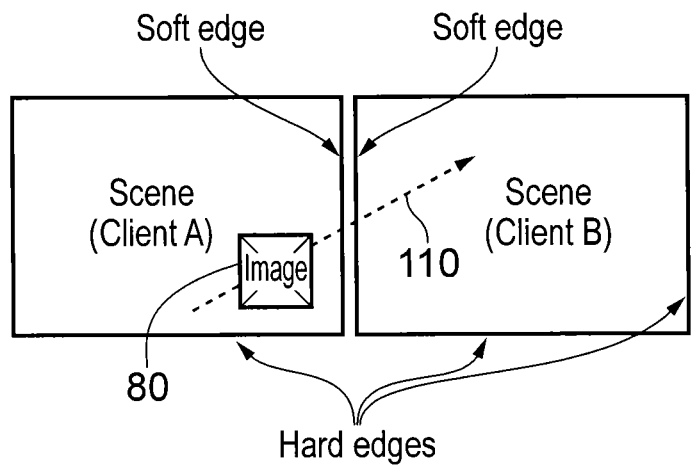
FIG. 4 schematically illustrates hard and soft edges.

FIG. 4 is a schematic illustration to introduce the concept of "hard" and "soft" edges. At a basic level, each edge of a scene is classified according to the property of whether an object moving towards that edge would bounce back from the edge or can pass through it, out of that scene and eventually enter another scene. In FIG. 4, the displayed object 80 is shown on a path 110 which will take it out of the scene corresponding to one client device and into the scene corresponding to another client device (labelled here simply as "client A" and "client B" to illustrate the fact that this is an arbitrary selection of two clients rather than representing a particular choice of two clients from FIG. 2). The peripheral edges of the composite canvas formed by the two adjacent scenes are classified as "hard" edges.

If the moving displayed object 80 reaches a hard edge, which it will in due course by following the path 110, in this embodiment it is controlled to "bounce" or rebound off the hard edge in a simulation of the laws of physics which would apply in theory to, say, a perfectly elastic collision between a moving snooker ball and the edge of a snooker table. So, at a collision with a hard edge, the displayed object will rebound such that the angle of incidence equals the angle of reflection and the object maintains its previous speed. Alternatively different motion paths and simulations of reflection physics may be envisaged.

On the other hand, if the moving displayed object reaches a soft edge, the object will pass through the soft edge such that it can be re-displayed on another scene corresponding to another client. This is the situation illustrated in the FIG. 4, in which the displayed object 80 is passing from the scene displayed by client A to the scene displayed by client B. If the two scenes are adjacent in terms of their positions in the canvas 100, then as a part of the displayed object 80 ceases to be displayed on one scene, it will almost straight away be displayed on the next scene. However, it is not essential that the scenes are adjacent within the canvas 100. There could be a gap. In such a case, to maintain the illusion that the object is really moving from one scene to the other, the object would disappear from view as it traversed a gap between the two scenes, re-emerging into the second scene (the scene displayed by client B in this example) after the appropriately calculated period of time corresponding to the object's speed and the virtual distance with respect to the canvas between the two scenes.

Accordingly the networked devices of FIG. 1 represent an example of a group of two or more client networked computer devices each being configured to display a respective portion of the virtual display region, in which each respective portion is defined by a set of edges, each edge being classified as a hard edge, from which the moving object is reflected, or a soft edge through which the moving object is allowed to pass.

In general, the normal intention would be that the physical client devices are arranged with respect to one another in the same manner as the arrangement of their corresponding scenes with respect to the canvas 100. However, this is of course not essential, so that (for example) the two scenes of a pair of scenes could be adjacent to one another in the canvas 100 (in the manner shown schematically in FIG. 4) but the corresponding physical client devices could be separated from one another (for example, in the manner shown schematically in FIG. 2). These sorts of choices are available to the system implementers.

The generation of a canvas 100 from a set of scenes will be described in more detail below. In one example, all of the edges of a scene are classified as hard edges until the canvas is established, at which time some of the edges may be reclassified as soft edges. Once the classification of hard and soft edges has been initially established, it can still be modified or redefined after that. For example, if a new scene is added to the canvas, or a scene is removed from the canvas, in both cases changing the number of scenes in the canvas, the definition of hard and soft edges can be changed to suit the new overall canvas. The definition of hard and soft edges can also be changed in response to a detection that the existing scenes in a canvas have been moved relative to one another, in terms of their virtual positions within the virtual canvas. In a further alternative, a scene (or a client device controlling a scene) could issue a message or an instruction (such as an "intent" message—see below) so as to redefine its edges in a particular way. For example, if a user is undertaking a processing task at a client device which will result in a modification of the moving object, that client device could temporarily redefine (or request the redefinition of) all of its edges as hard edges.

Figure 5:
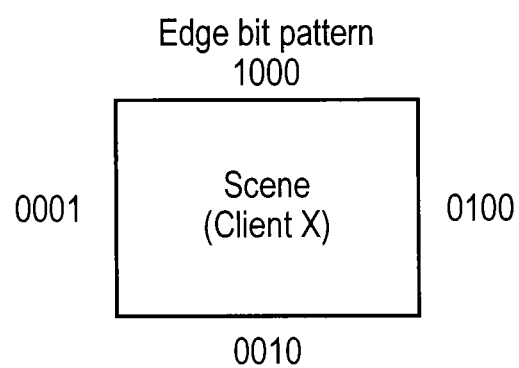
FIG. 5 schematically illustrates edge bit patterns.

FIG. 5 schematically illustrates edge bit patterns, which are used in the present embodiments to identify the orientation of an edge. One use of the edge bit patterns will be described below in connection with FIG. 21. The example edge bit patterns of FIG. 5 give each of the four edges of a rectangular scene a unique four bit pattern or code.

Figure 6:
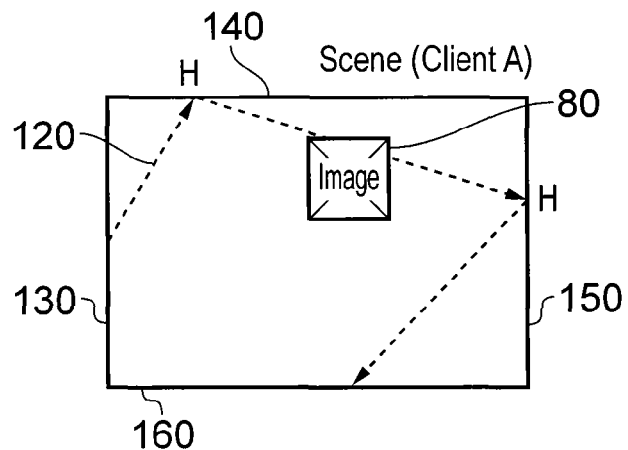
FIG. 6 schematically illustrates a bouncing motion within a single client display.

FIG. 6 schematically illustrates a bouncing motion within a single scene. The object 80 is following a path 120 from a left-hand edge 130, to an upper edge 140, to a right-hand edge 150 and from there to a lower edge 160. The upper edge 140 and the right-hand edge 150 are hard edges, so the path 120 followed by the object 80 rebounds from each of those two edges. FIG. 6 does not in fact define whether the left-hand edge 130 and the lower edge 160 are hard or soft, but for the purposes of discussion it will be assumed that they are soft. In this case, it is assumed that the object 80 entered the displayed scene through the left-hand edge 130 and will exit the displayed scene through the lower edge 160.

Figure 7:
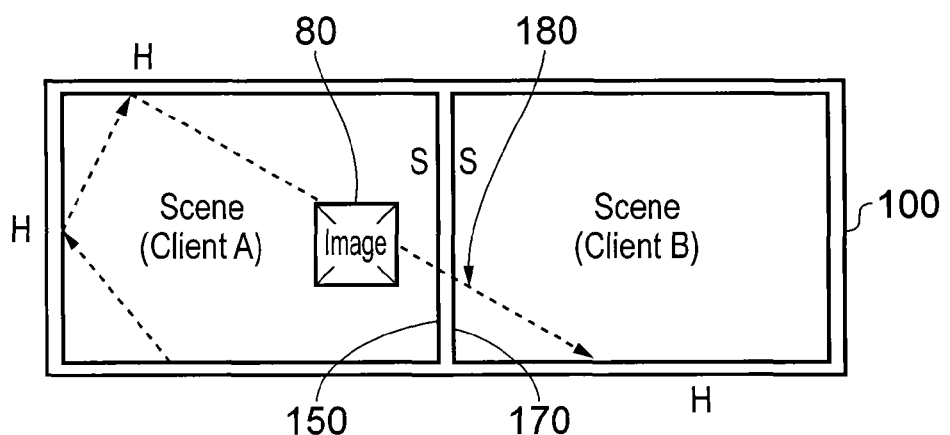
FIG. 7 schematically illustrates a transit of a displayed moving image from one client display to another.

FIG. 7 schematically illustrates a transit of the displayed object 80 from one scene to another. In particular, the left-hand scene (client A) forming part of the canvas 100 can be considered as the same as the client A scene shown in FIG. 6, except that the right-hand edge 150 is soft rather than the hard edge shown in FIG. 6. This edge 150 is adjacent, within the canvas 100, to a soft edge 170 of the adjacent scene from client B. At a "cross over point" 180 the displayed object 80 makes a transition from the scene displayed by client A to the scene displayed by client B.

In general terms, a client defines the path taken by the object within that client's own scene.

The displayed object 80 would normally be expected to encompass many more than one pixel in width and height, in order for the user to be able to see it; it is shown schematically in the drawings as a square box, but of course any required shape and design may be used. In the context of a system in which there is either no gap or a very small gap between adjacent scenes in a canvas, the expectation would be that the displayed object 80 would be wider than the separation between two horizontally adjacent scenes. The effect of this is that there will be stages during the transit from one scene to another when the displayed object 80 is partially displayed in one scene and partially displayed in the next. Techniques to achieve this in a way which looks natural to the user will be described below.

Figure 8:
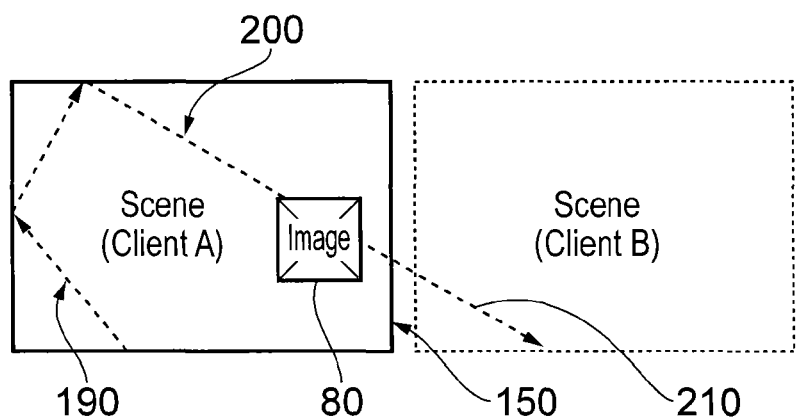
FIG. 8 schematically illustrates the transit of FIG. 7 in more detail.

FIG. 8 schematically illustrates the transit of FIG. 7 in more detail. The path 190 followed by the displayed object 80 is referred to as a cross over path when it will result in the displayed object 80 making a transit from the current scene to a next adjacent scene. The path 190 comprises different segments, the segments being separated by changes in direction, and the last segment 200 being referred to as the last segment of the cross over path from the point of view of client A. The displayed object 80 enters the scene displayed by client B on the same path, but in the context of client B the path is now referred to as the first segment of the cross over path 210.

Note that the path followed by the displayed object need not be straight. In response to the cross-over point at which the path makes a transit into the next scene, a client can define a non-straight path within that scene, and calculate a cross-over point as the object leaves that scene.

The way in which transits of the displayed object are handled will be described below in more detail. First, however, the technical nature of the network of FIG. 1 will be described further with reference to FIG. 9.

Figure 9:
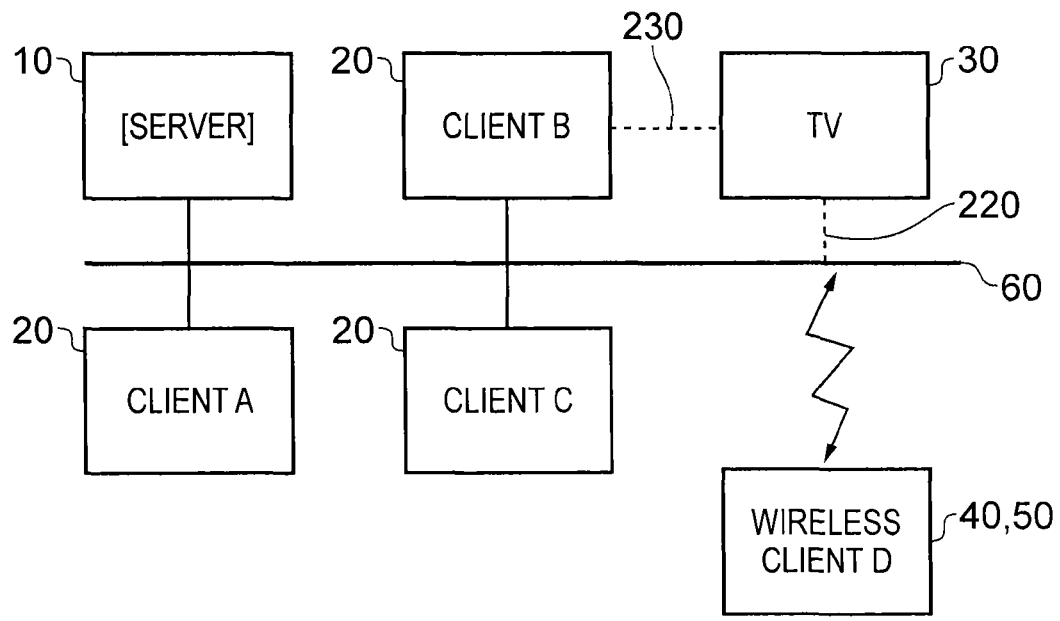
FIG. 9 schematically illustrates the network of FIG. 1 in functional terms.

FIG. 9 shows a similar arrangement to that illustrated in FIG. 1. Various devices are connected by wired or wireless links to the network 60. Among the devices are client devices such as the devices 20, 40, 50. In a client-server system, the functionality of a server needs to be provided, but this can be either as a stand-alone server 10 or alternatively one of the client devices can provide the functionality of the server. In the present context, the server is to be considered as a computing device which is connectable to client devices to provide data resources and overall control or supervision of the rendering operations of the client devices to allow for the animation of the displayed object 80 between the different client devices.

Figure 10:
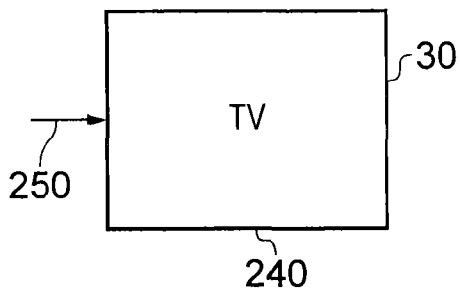
FIG. 10 schematically illustrates a display scene.

Several of the client devices may have their own associated display. This would apply to a mobile telephone, a tablet computer or a laptop computer. A television receiver such as the television 30 in FIGS. 1 and 9 may or may not have sufficient intrinsic processing functionality to act as a client in its own right. Traditionally, television displays were "dumb" devices in that they simply received and displayed signals which were provided to them. This form of television display is schematically illustrated in FIG. 10, which represents a display screen 240 simply displaying signals provided to it as an input 250. More recently, however, some television displays such as so-called "smart televisions" have a considerable amount of internal processing functionality and are operable to provide the type of processing and rendering functions to be described below in connection with a client in FIG. 9. To accommodate these different possibilities within FIG. 9, the television display 30 is shown as potentially being linked directly to the network 60 by a direct connection 220 or alternatively being controlled by one of the clients 20 by a connection 230.

Figure 11:
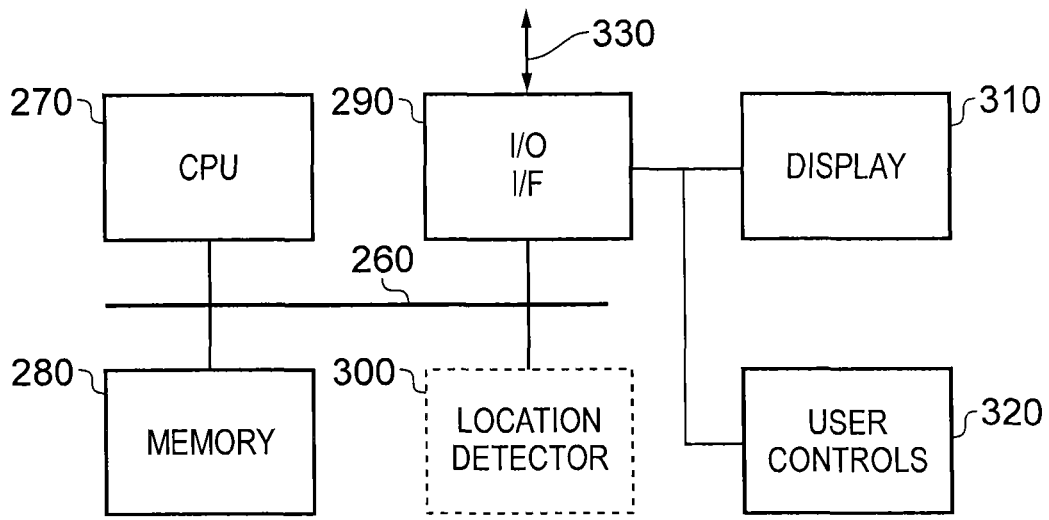
FIG. 11 schematically illustrates a client or server device.

As further technical background, FIG. 11 schematically illustrates the internal functionality of a client or server device. It will be appreciated by the skilled person that FIG. 11 is a very general illustration of such a device, and further components may be included in such a device.

Referring to FIG. 11, the client or server device comprises a bus 260 to which are connected a processor 270 (shown as a "central processing unit" or CPU), one or more memory devices 280, and input/output (I/O) interface (I/F) 290, optionally a location detector 300 and a user interface which, in this example, is shown as comprising a display 310 and user controls 320.

The one or more memory devices 280 can comprise, for example, read only memory (ROM), random access memory (RAM) and non-volatile storage such as magnetic or optical disk storage or flash memory storage. In basic terms, the memory devices 280 allow the storage of operating software representing processing operations to be carried out by the processor 270 and working data used as part of those processes, such as image rendering data and data defining the path of an object to be displayed.

The input/output interface 290 provides for data connection between the other components of the device of FIG. 11 and the user interface components 310 320. It also provides the network connection 330 to the network 60.

The location detector 300 is optional. It can be used as described below to provide an automated detection of the relative physical positions of displays forming a canvas 100. Location detection technology is known, particularly in the field of portable computing devices such as laptop computers, mobile telephones and tablet computers. At a coarse level, geographical location detection systems such as the global positioning system (GPS) can be used to detect the position of a device. At a finer level of detail, devices such as accelerometers and gyroscopes are used to detect changes in position of portable devices. Any and all of these location detection arrangements can be provided as the location detector 300.

In operation, the processor 270 acts as a path controller, associated with each client computer device, for detecting a path of the moving object with respect to the portion of the virtual display region which is displayed by that client computer device; the path controller being configured, when the path controller detects a path which intersects a soft edge of that client computer device's portion of the virtual display region, to transmit data defining the path of the moving object for use at least by another client computer device which displays the next portion of the virtual display region which will lie within the detected path of the moving object.

The operation of the client-server described above will now be described with reference to FIGS. 12 and 13 and the flowchart of FIG. 22.

Figure 12:
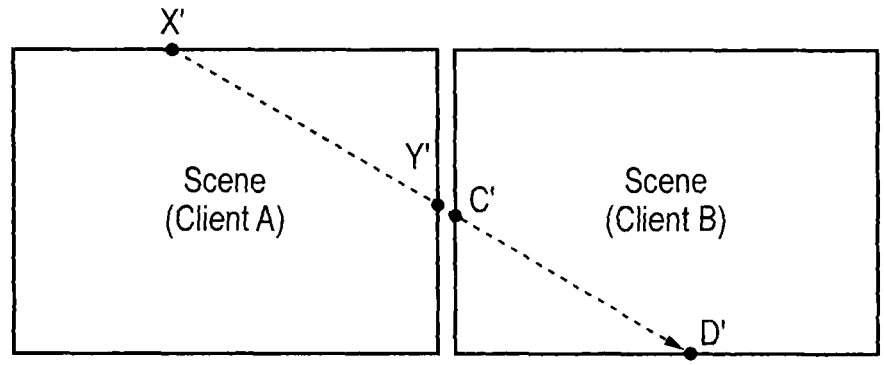
FIGS. 12 and 13 schematically illustrate the translation of coordinate systems.
Figure 13:
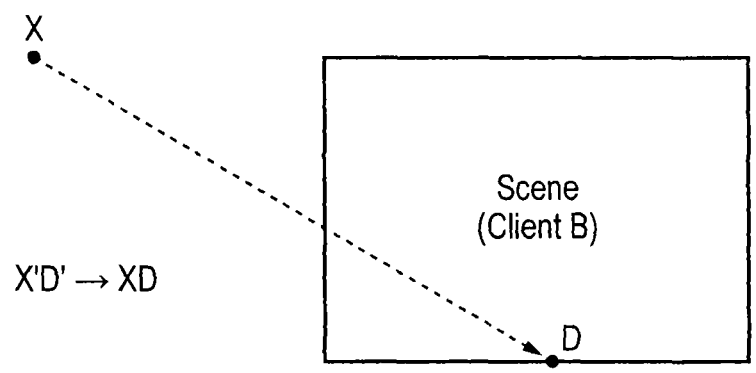

In particular, FIGS. 12 and 13 schematically illustrate the translation of coordinate systems that will be discussed below. FIG. 22 is a flowchart showing operations of two clients (client A and client B) and a server 10. These operations are represented in respective columns of FIG. 22. It should be noted that the operations are the same whether or not the server 10 is provided as a stand-alone device or as part of the functionality of one of the clients in a network of interconnected clients.

Figure 22:
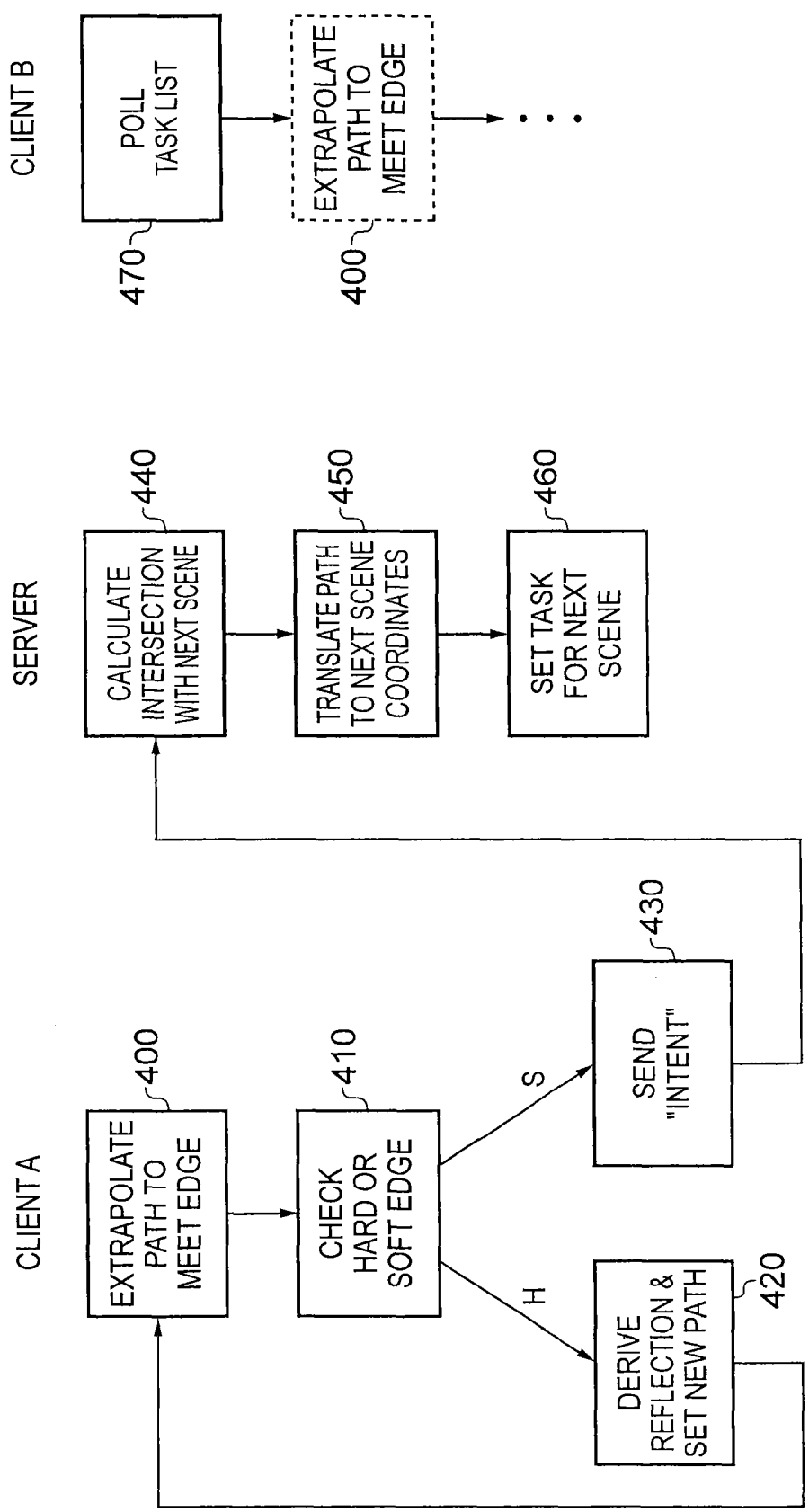
FIG. 22 schematically illustrates an edge-crossing process in a client-server system.

Referring to FIG. 22, the process starts with the assumption that the displayed object is currently displayed on the scene corresponding to client A. Client A computes a cross over path which, as discussed above, comprises successive segments leading up to a last segment during which the displayed object makes a transit out of client A's scene. This process is represented by the following steps in FIG. 22:

At a step 400, the client A extrapolates the current path of the displayed object 80 until the path meets an edge of the scene displayed by client A. At a step 410, the client A detects whether that edge is a hard or a soft edge. If it is a hard edge then at a step 420 the client A derives a reflection vector and sets a new path segment, before returning control to the step 400. As discussed above, the reflection can be based on simple physical laws assuming a perfectly elastic collision with the scene edge.

If on the other hand, the edge that is detected at the step 410 is a soft edge, then at a step 430 the client A sends a so-called "intent" message to the server 10.

The "intent" message defines the displayed object's current path relative to the coordinate system of the scene displayed by client A. It also defines the temporal position of the displayed object. As an example of this temporal information, the intent message might define the time, relative to a temporal reference which is common to the server and the clients, at which the displayed object 80 will leave the scene displayed by the client A. The way in which the temporal reference is defined so as to be common between the server and clients will be discussed below. The time at which the displayed object 80 will leave the scene may be defined in terms of the first pixel of the object to leave the scene or a time at which a centre or other suitable reference point within the displayed object 80 leaves the scene.

Throughout the processing of the steps 400 . . . 430, the client A continues to render the displayed object for display according to its calculated path. Similarly, although steps which are carried out by the server 10 will now be described, during the time that these steps are executed the client A will also continue to render the displayed object for display.

In response to the "intent" message, the server 10 first calculates (at a step 440) the intersection of the current path of the displayed object 80 with the next scene. To do this, the server 10 refers to definitions of the positions of each scene with respect to the global (canvas) coordinate system, and translates the vector representing the last segment of the cross over path in the scene displayed by client A to a corresponding path in the global coordinate system. Referring to FIG. 12, this path in the global coordinate system is referred to as the path X'-Y', where the apostrophe signifies the global coordinate system.

Using the path X'-Y' and the known position of the other scenes within the global coordinate system, the intersection C' at which the displayed object will enter the scene displayed by the client B can be calculated, along with the point D' at which the displayed object will first meet an edge of the next scene. The points C' and D' therefore define a path segment within the scene displayed by the client B, but in the context of the global coordinate system.

The server then, at a step 450, translates the calculated path X'-D' in the global coordinate system into a path vector with respect to the local coordinate system of the scene displayed by client B. This translation is illustrated schematically in FIG. 13 by the translation of X'-D' in the global coordinate system into the vector X-D in the coordinate system of client B.

At a step 460, the server set a "task" for the client responsible for the next scene, which in this case is client B. The task is added to a queue of tasks to be accessed by the clients.

Therefore, in an example of a client-server system, the server computer device is operable to maintain data defining the size and relative position of each portion within the virtual display region; the client computer devices are operable to transmit the path data to the server computer device; and the server computer device is operable to detect, from the path data, which client computer device displays the next portion of the virtual display region which will lie within the detected path of the moving object and to provide path data to the next client computer device to initiate rendering of the moving object by that next client computer device.

In embodiments of the disclosure, the server computer device is operable to receive the path data from a client computer device according to a coordinate system local to the transmitting client computer device and to translate the path data into the coordinate system local to the next client computer device for provision to that next client computer device.

Note that information defining the content of the displayed object can also be passed from client to client as the displayed object moves to a new scene, in a similar manner to that discussed below with reference to FIG. 23.

The tasks communicated by the server 10 to the clients can include various types of operation. Examples are:

Scene Change: this task is used to update the definitions of hard and soft edges associated with the clients;

Random Motion: this task is used to initiate a "random" motion of the displayed object. In fact, a pseudo-random motion is initiated with a "random" initial direction, starting position and speed;

Random Motion Cross: Note that in example embodiments the Random Motion task is simply a random motion for a predefined period a time, which considers all edges as hard. In other words, the logo will stay inside current client's boundaries and bounces randomly from its edges. This is used at the beginning, when only one client (which in some embodiments might be the same PC or computing device which is also running the server) is registered. Once the second client registers its scene with the server (and some edges become soft), the task Random Motion Cross is planned, bouncing the logo from hard edges until a soft edge is hit. At this point the intent is sent to the client, so it will continue planning a logo path across its screen.

Motion Cross Into: this is a response to the intent message received from a client (for example, after the step 430 of FIG. 22). The server detects all clients having scenes which are intercepted by the vector provided as part of the intent message. The server then assigns the "motion cross into" task to the first client intersected by this vector.

Reset: this simply resets all of the information relating to the definition of the canvas.

Figure 27:
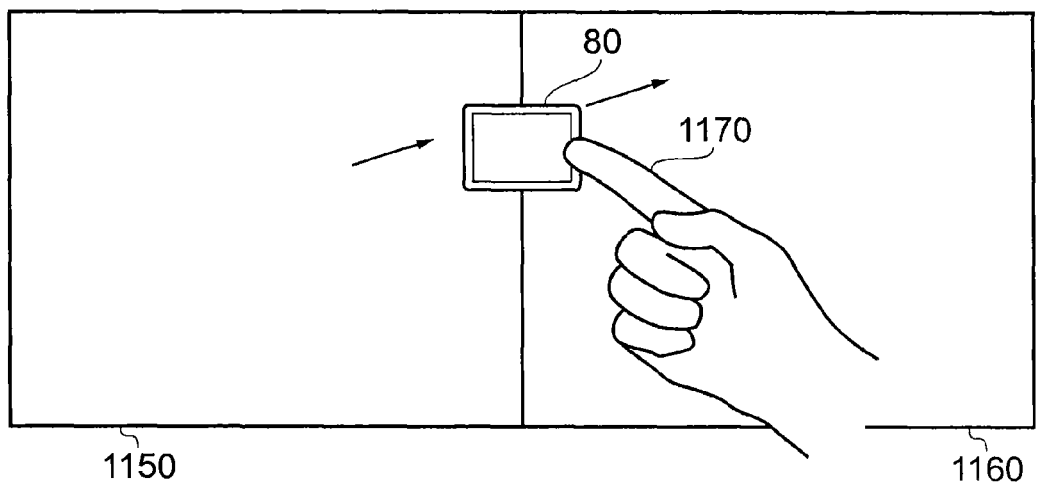
FIG. 27 schematically illustrates a user touching a touch-screen at a point where an object is currently displayed.

Uses or refinements of the tasks such as "motion cross into" allow features such as the user "flicking" a photograph or other content through a soft edge by means of the flicking motion described with regard to FIG. 27, though in some examples the photograph might just move along a trajectory and stop after moving over the other (for example, the adjacent) client's screen for a certain distance. Or maybe the user might identify the coordinates of the other client's scene (which may or may not be the adjacent scene in the virtual canvas) to which he wants to "send" the photo and thus define a certain motion path with an end point, an initial velocity and, optionally, an associated simulation of momentum and deceleration.

So, in the present case, at the step 460 the tasks set for the next scene is a "motion cross into" task having (for example) the format:

MotionCrossInto (X, D, start_time)

This task is added (by the server) to the task queue maintained by the server as a next task for (in this example) client B. The variables X and D correspond to the positions, within the coordinate system of client B, shown in FIG. 13. These variables uniquely define the path vector within the coordinate system of client B. The variable start_time defines, in this example, the time at which the path starts at the point X, though in other embodiments it could be arranged to define the time at which the displayed object enters the scene defined by the client B. In a further alternative, just the crossing point may be defined, so that the client receiving the moving object is able to decide how and according to what physics or other rules that object should move after it enters that client's scene.

The clients each poll their respective task queues regularly. The polling operation involves consulting the queue of tasks held by the server in respect of that client to see whether any new tasks have been added to the queue. The polling system will be described in detail below. For now, it is sufficient to say that at a step 470 the client B polls the server's task list, such that the first occasion on which the step 470 takes place after the task has been set at the step 460 will result in the client B receiving the "motion cross into" task set at the step 460. In response to the received task, the client B prepares to render the displayed object and also starts a process corresponding to the steps 400, 410, 420, 430 previously described with reference to the client A.

Figure 14:
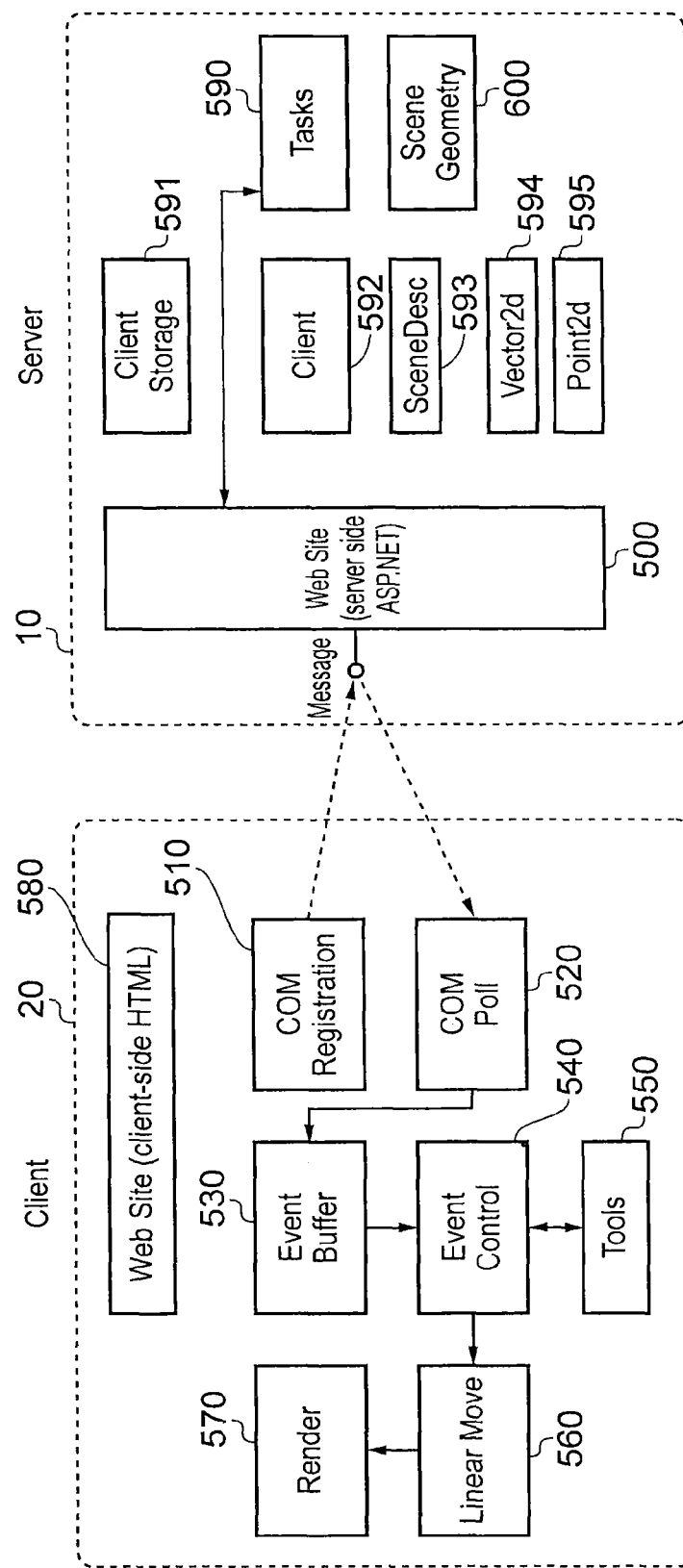
FIG. 14 schematically illustrates functional aspects of a client and a server.

FIG. 14 is a schematic representation of functional aspects of the client and server devices which carry out the steps discussed above. The functionality of FIG. 14 is provided by the features set out in FIG. 11 and described above.

In basic terms, the interaction between the client and the server in this embodiment can be carried out using the "component object model" or "COM" system, which is an established language-neutral technique for providing intercommunication between software components, or just as software classes treated as logical components. The server 10 maintains a server-side website 500 which the clients can register with (establish initial communication and parameters with) using a COM registration module 510, and which the clients can poll using a COM poll module 520. The polling operation involves sending a message to the server-side website 500 and receiving from the server-side website 500 details of any queued tasks relating to the requesting client.

A received task is passed to an event buffer 530 at the client, from which it is read out at the appropriate time of execution by an event control module 540. The event control module interacts with software tools 550 providing some of the functions required by queued tasks, such as the derivation of path vectors and intersections. The movement and rendering of the displayed object 80 is handled by a linear move module 560 and a rendering module 570.

A client-side website 580 handles interaction with the client.

At the server side, server tasks are handled by a task execution unit 590. The tasks are in some cases initiated by "intent" or other messages received from clients, and in other cases by the server acting as overall supervisor of the multiscreen display system. The server maintains a store 600 defining the geometry and coordinate systems of the individual scenes and also the overall canvas. Classes shown in FIG. 14 include:

a. ClientStorage 591—a list of registered clients (each one of them with its own scene description, scheduled tasks)

b. Client 592—One client in the ClientStorage list c. SceneDesc 593—Description of the scene (dimensions) and hard/soft edges in a client d. Vector/Point 2D 594, 595—basic maths primitives representations—used for path calculation on the server side.

Figure 15:
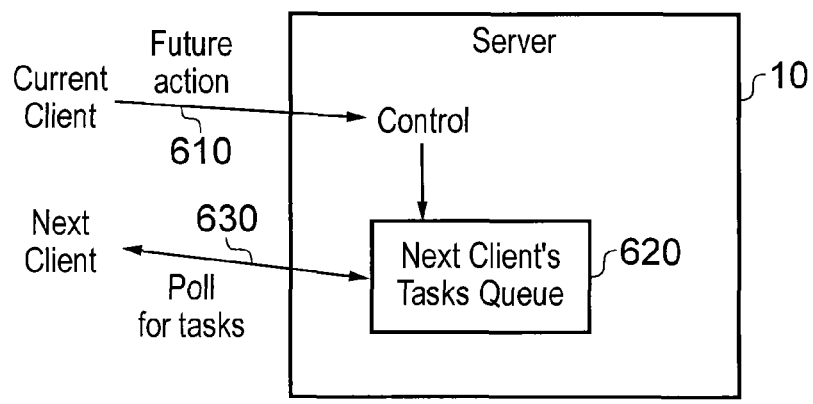
FIG. 15 schematically illustrates the transfer of action data from one client to another via a server.

FIG. 15 schematically summarises the transfer of data defining required actions from one client to another via the server. A current client issues a message such as an intent message 610 to the server 10, defining a future action such as an action required by another client. The server processes the message to derive a future action expressed in terms of parameters of a next client, and adds the future action to the next client's task queue 620, or to a generic queue from which the next client identifies an appropriate task, for example by data identifying a client associated with each task. The next client carries out a polling operation 630 to poll that client's task queue for newly added tasks.

A feature of the system described above is a common time reference amongst the server and the clients forming the multiscreen display system. A technique for establishing such a common time reference will be described with reference to FIG. 16. Using these techniques, the client computers and/or the sever computer are operable to establish a shared reference time; to define the path data with reference to the shared reference time; and to render the moving object according to the shared reference time.

A significant feature of a common time reference as described is that the time reference relates to operations (in this case, the rendering of an object for display) which relate to the real or physical world. In other words, the motion of the rendered displayed object should appear, to the user, to be based upon a time reference which is consistent between the different display devices contributing to the rendering. This is particularly important when the displayed object crosses from one scene to another scene. However, within each individual processing device (client or server) the internal timing of processing operations can be carried out according to a local clock as normal. So, the consistent time reference is established only for use in synchronising the movement of the output rendered image.

Figure 16:
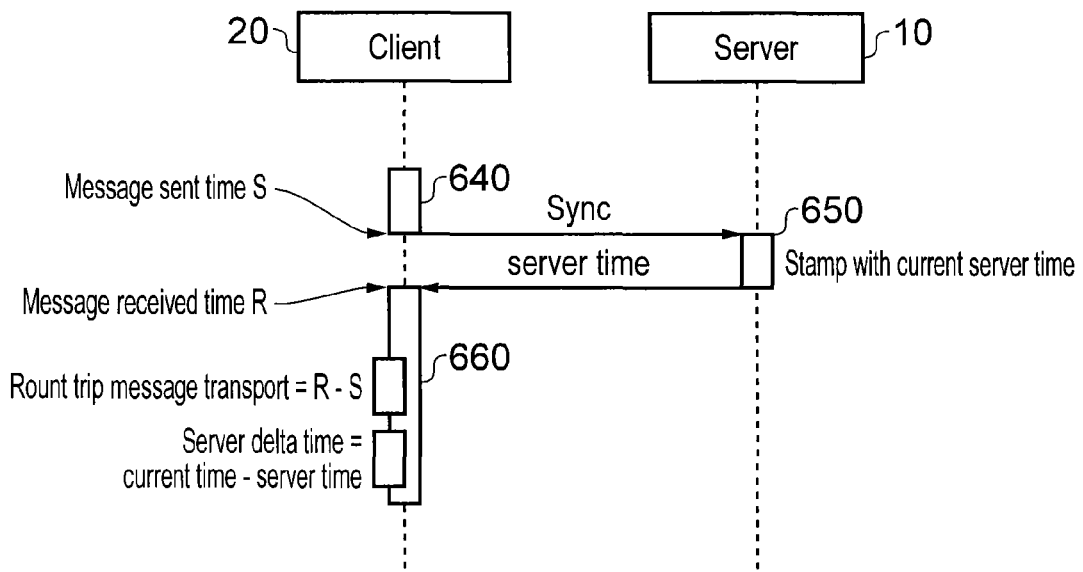
FIG. 16 schematically illustrates a time synchronisation process.

Referring to FIG. 16, according to the depicted embodiment each of the clients which are associated together in a multi-screen system synchronises its "real world" clock, that is to say the time reference which is used for coordinating motion of the rendered displayed object, to a time reference defined by the server. The synchronisation process may make use of the transmission of an empty message 640 from the client to the server. Here, an empty message refers to a message carried by the network 60 which has either no payload or a minimum size dummy payload. The reason that an empty message is used is that its small size means that any delay or latency in the delivery of the message is caused by the network connections rather than by the fact that a long message has to be handled by either the sender or recipient.

The message is sent by the client at a message sending time S, which the client records. When the server receives the message 640, the server modifies (at a step 650) the message to refer to the current time at the server. This process is sometimes referred to as applying a "timestamp" to the message. The server then immediately returns the message to the client, which receives it at a time (in the client's reference) R.

The transmission time of a message from the client to the server or from the server to the client is derived by the client (at a step 660) as follows:

round trip message transport time=RTTT=$R-S$ one way message transport time=OWTT=$(R-S)/2$ The difference between the server's time reference and the client's time reference is also derived by the client as follows:

Time_difference(CLIENT $n$)=$(R-$(server time stamp+ OWTT))

The operations shown in FIG. 16 may be carried out a number of times (such as 10 times) so as to derive average values of the variables described above. This overall process can also be repeated at intervals (such as every 5 minutes) to recalibrate the time difference variable.

In this way, each client can derive a time difference between that client's internal time reference and the time reference used at the server. Whenever an operation has to be coordinated with other clients, such as the rendering operation relating to a displayed object, the timing of that operation is referred back to the server time, using the time difference that has been derived.

An exemplary process by which the clients can register with (initiate their interaction with) the server will now be described with reference to FIGS. 17-19.

Figure 17:
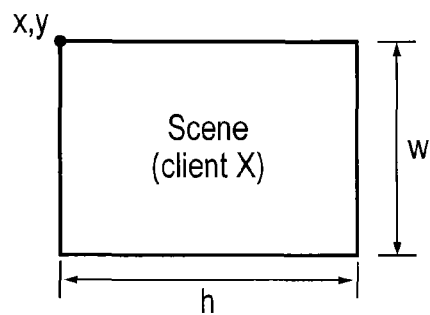
FIG. 17 schematically illustrates coordinate systems within a single client's display.

Referring to FIG. 17, a client may define its own scene (the extent of its own display) in terms of the following variables:

scene x,y: the pixel coordinates of a predetermined corner (in this example, the top-left corner) of the scene with respect to the global (canvas) coordinate system; this can be established manually or in response to a machine detection of the relative physical positions of the different display devices.

scene width (w) and height (h) in pixels reset parameter to allow resetting of some or all of the parameters Accordingly, using these techniques, a client computer device is operable to detect a difference between an internal time at that client computer device and the shared reference time at the server by transmitting a message to the server; the server is operable to send the message back to the client computer device; and the client computer device is operable to detect the transit time for the message and to detect the time, at the server according to the shared reference time, when the message was sent back to the client computer device.

The client sends this information to the server as (for example) a so-called HTTP GET query to the server-side website described above. The variables are expressed as parameters within such a query. An example of such a query is as follows:

http://192.168.11.31/multi/
default.aspx?x=0&y=0&w=400&h=400&reset=1

Figure 18:
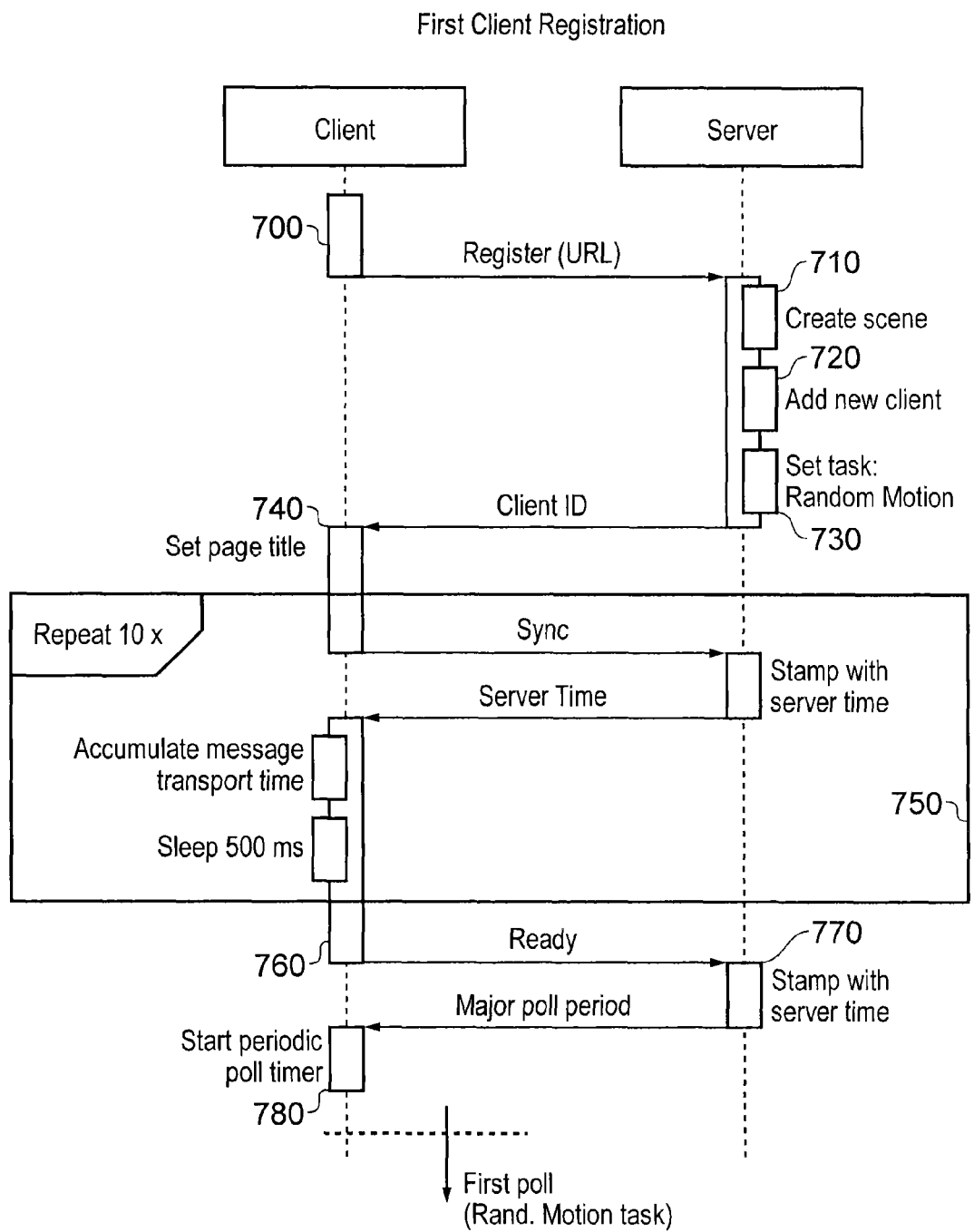
FIGS. 18 and 19 schematically illustrate client registration processes in a client-server system.
Figure 19:
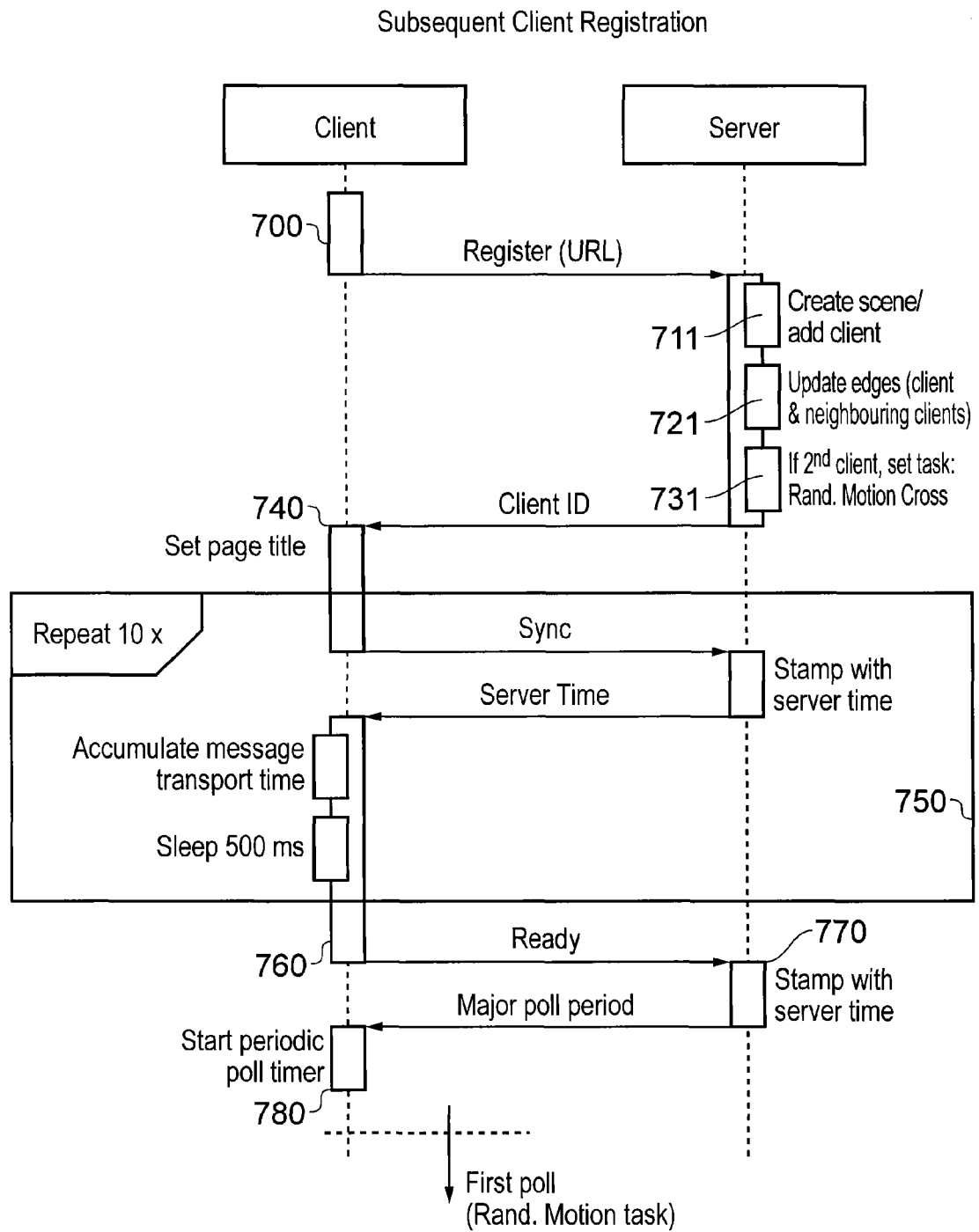

FIGS. 18 and 19 refer to examples of client registration processes. In particular, FIG. 18 refers to the first client to register with the server, and FIG. 19 refers to subsequent clients registering with the server.

Referring first to FIG. 18, at a step 700 the client sends (for example) an HTTP GET message of the type described above to the server to initiate registration. At a step 710, the server processes the registration request to create a scene within a new canvas and, at a step 720 adds the requesting client to its list of registered clients. At a step 730, the server may set a "random motion" task as discussed above, to initiate random motion, although this is of course an optional feature at this stage and need not form a part of the registration process. It is also noted that such a task could in fact be initiated by a client after registration. The task is added to that client's task queue (to be retrieved by the client at the next polling operation) and a client identifier client_ID is transmitted to the requesting client.

At this stage, all of the edges of the registered client's scene will be classified as hard edges, because there are not yet any other scenes within the canvas.

At a step 740, the client sets a variable page_title to define the current canvas or scene with respect to other canvases or scenes.

The client and server then (for example) carry out the time synchronisation process 750 described above with reference to FIG. 16. This process will not be described again here.

Once the time synchronisation process 750 has been carried out, the client is considered to be "ready" for operation. It sends a "ready" message to the server at a step 760. At a step 770, the server stamps the "ready" message with its server time and indicates when the client should start polling the server for queued tasks, also indicating the period of such polling. In response to this at a step 780 the client initiates a periodic polling timer which (for example, using an interrupt mechanism) will initiate the polling process at regular intervals at the client. Of course, the first time that a polling operation takes place, the random motion task set at the step 730 will be retrieved (and then acted on) by the client.

FIG. 19 relates to a corresponding operation carried out by subsequent clients. That is to say, the steps of FIG. 19 are carried out when a further client is registering to join a canvas which already has one or more registered clients. Steps which are identical to those described with reference to FIG. 18 will be shown by the same reference numerals and will not be described again.

Instead of the step 710 in FIG. 18, a step 711 is carried out by the server which adds the scene represented by the newly joining client to the existing canvas, although of course the canvas itself may be redefined as a new canvas when a scene joins. An optional step (not shown) may check that a newly joining scene does not overlap, in respect of its position within the virtual canvas, an existing scene.

At a step 721, the server updates the definition of hard and soft edges in relation to the newly added client's scene and also all of the previously registered scenes so as to automatically introduce soft edges, for example between adjacent scenes in the overall canvas.

If this is the second client to be registered, then at a step 731 the server may set a "random motion cross" task to be added to the queue for both the original and the newly registered clients. Again, this is not an essential part of the registration process. Also, it may instead be initiated by a client rather than the server.

Figures 20, 21:
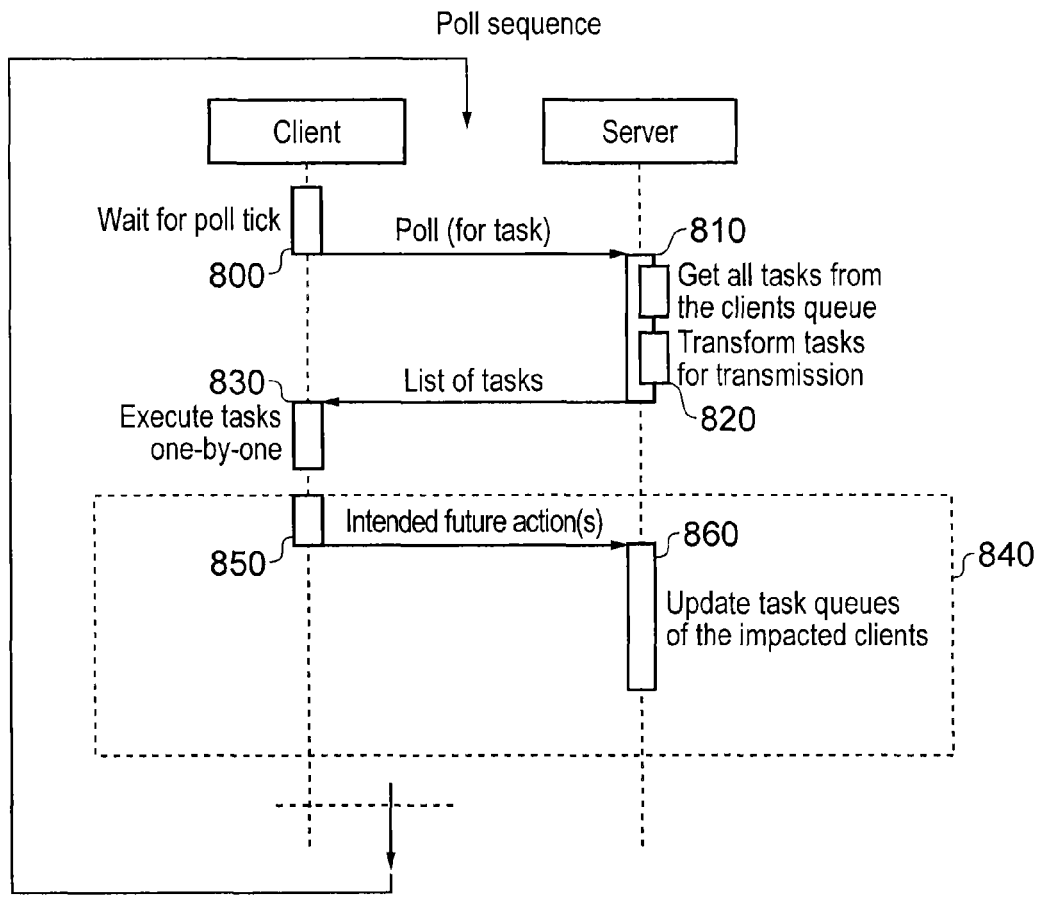
FIG. 20 schematically illustrates a polling sequence carried out by a client.
FIG. 21 schematically illustrates a table of edge data.

FIG. 20 schematically illustrates an example of a polling sequence carried out by a client.

A step 800 represents the client waiting for a "poll tick", which is to say that the client waits for the initiation of a polling operation by the periodic poll timer referred to in the discussion of the step 780 in FIG. 18. Of course, while the client is waiting, it would be carrying out other processing operations such as normal rendering operations and the like. Indeed, if an interrupt mechanism is used to initiate polling, normal processing can carry on fully in between polling operations. When a poll tick is received, the client sends a polling message to the server to request any tasks in that client's queue held by the server.

At a step 810, the server retrieves all tasks from that client's queue. In the present embodiments, once a task has been retrieved at the step 810 for forwarding to the client, the task is removed from the client's queue. So, the tasks that are retrieved at the step 810 are tasks which have been newly added since the last polling operation. However, in other embodiments, tasks which have been completed or which have been already sent to the client could be retained in the relevant queue, but this could lead to the queue requiring excessive data storage or transmission capacity. At a step 820 the retrieved tasks are formatted into an appropriate data string format for transmission to the client, and are sent as a list to the client.

At a step 830, the client receives the list of tasks from the server and executes them, for example in the queue order, that is to say, the order in which they were first added to the queue by the server.

This completes the task polling operation from the point of view of the client. For completeness, FIG. 20 also illustrates a set of operations 840 relating to the handling of "intent" messages.

In many cases, an intent message will result from the execution of a task by the client. But in general, an intent message is generated by the client at a step 850 and is sent to the server to indicate an intended future action. At a step 860 the server updates the task queues of any and all clients which are affected by the intended future action.

The polling sequence then repeats according to the interval set by the periodic poll timer. This interval may be, for example, 500 ms in a typical system, though in some interactive applications to be described below, a shorter period such as 100 ms may be appropriate for a polling interval.

FIG. 21 schematically illustrates a table of edge data, which may be in the form set out as an example in FIG. 5. Each client would normally maintain data defining the edges of its own scene, in order that the test carried out at the step 410 in FIG. 22 can be handled. In other words, the client mainly just needs to know whether each of its own edges is hard or soft.

At the server, however, a global list of edge properties is maintained, having been set at the step 721 in FIG. 19. The edge property data includes an identification 870 of each scene, an identification 880 of each edge within that scene, an indication 890 of whether each such edge is hard or soft and, optionally, an indication 900 of the "next" scene or scenes relevant to a displayed object emerging from that particular edge. The definitions can be altered in real time or at initiation of execution of the system, in dependence upon which devices (including potentially newly registered devices) are actually present.

In the description above, the interactions have been based upon a client-server model, in which a server maintains an overall supervisory role of the canvas and rendering tasks relating to each client. As an alternative, a "peer-to-peer" model may be employed in which clients communicate directly with one another.

In a peer-to-peer arrangement, each client maintains a specification of the overall canvas and the positions and sizes of all of the clients within the canvas. When a new client joins the canvas, the new client sends details of its own position and size to all existing clients and also requests details in return of the position and size of those existing clients. A protocol can be established which (for example) defines that any edge of a scene which forms or is adjacent to an outer boundary of the canvas is defined as a hard edge, where any edge of a scene which is internal to the canvas is defined as a soft edge.

Tasks are transmitted as peer-to-peer messages from an initiating client to a target client. Time coordination can be with reference to a shared global time reference, based upon a time reference at one of the clients such as a first client to join the canvas, or in other embodiments each pair of clients could create a time reference between them. In either instance, time coordination is carried out using the technique described above.

Figure 23:
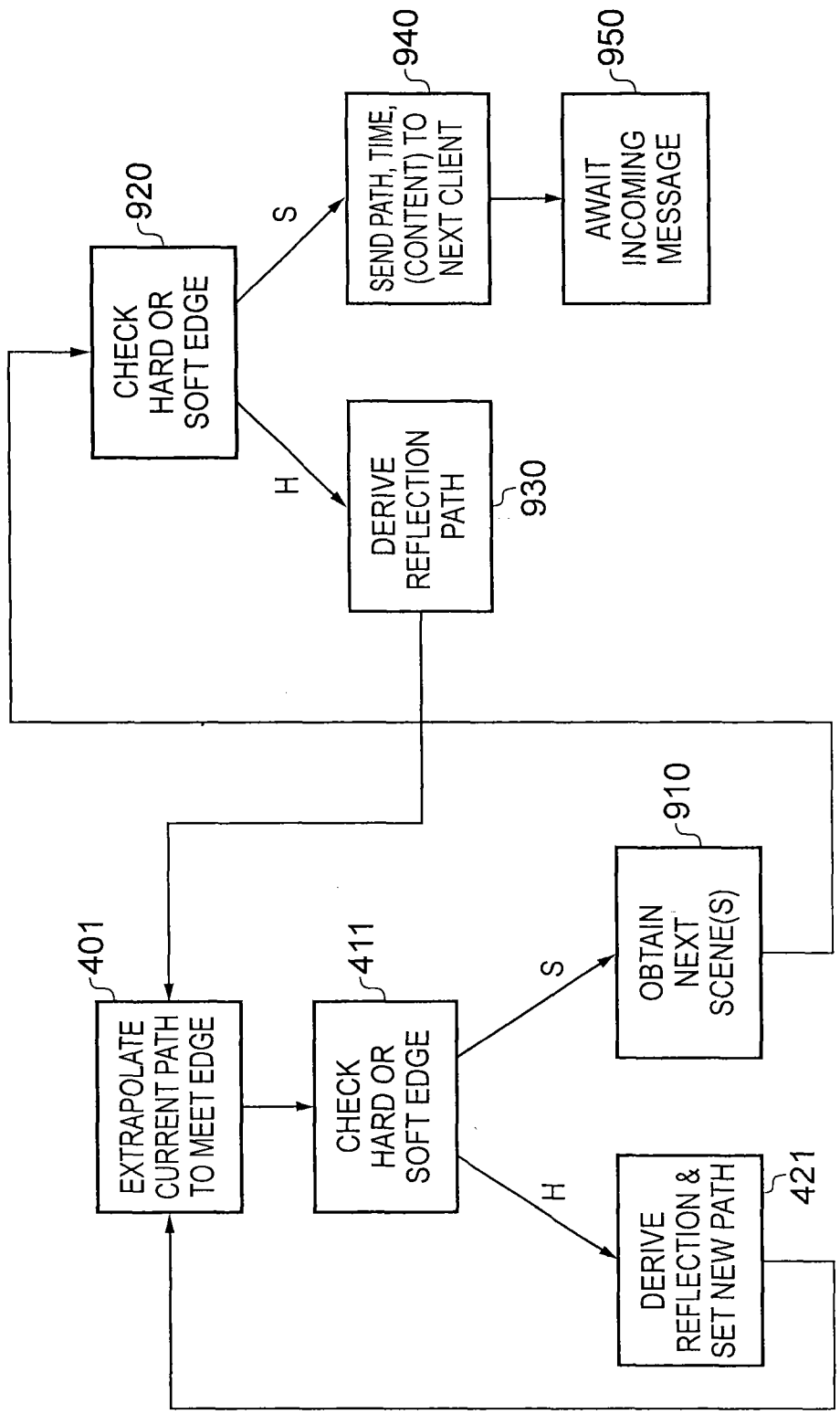
FIG. 23 schematically illustrates an edge-crossing process in a peer-to-peer system.

As an example of how this system operates in respect of a peer-to-peer model, FIG. 23 schematically illustrates an edge-crossing process in a peer-to-peer system. In this regard, FIG. 23 represents operations which correspond to those described for the client-server model with reference to FIG. 22.

The steps shown in the FIG. 23 relate to operations at a single client. Corresponding operations would be carried out at all other clients. For the purposes of discussion, the client which starts the process shown in FIG. 23 is considered to be the client which is currently rendering and displaying the displayed object 80.

A step 401 corresponds to the step 400 in FIG. 22, in which the current path of the displayed object 80 is extrapolated to meet an edge of the scene corresponding to the current client. A step 411 corresponds to the step 410 of FIG. 22, at which a check is made as to whether the intersected edge is a hard or a soft edge. If it is a hard edge, then at a step 421, which corresponds to the step 420 in FIG. 22, a reflection is generated and a new path established. Control returns to the step 401.

If, however, the detected edge is a soft edge, then the client determines which scene the displayed object 80 will enter when it emerges from that soft edge. This is carried out at a step 910 and makes use of the data stored at each client defining the position and size of that and other scenes within the overall canvas. An optional check can then be carried out at a step 920 as to whether the edge of the next scene which the displayed object will intersect is itself a hard or a soft edge. In principle, if the rules described above are followed by each client, then the relevant edge of the next scene should by definition be a soft edge. Or a default could be set that any edge is considered "soft" for the purposes of incoming objects; the hard/soft distinction applying only to outgoing objects. But if for any reason it is a hard edge, a reflection path is derived at a step 930 and control returns to the step 401.

Assuming, however, that the definitions have operated correctly and the recipient edge of the next scene is indeed a soft edge, or in the case where the step 920 is omitted altogether, the client sends a message (at a step 940) to the next client defining the path of the displayed object (for example, in the coordinate system of the canvas) and giving time information which the next client can use to determine when the displayed object will intersect the next scene. The time information can be, for example, a reference time at which the displayed object is or will be at a particular point along its path with reference to the global coordinate system.

Optionally, the message sent at the step 940 can include data defining the content of the displayed object. The purpose of this optional arrangement will be described below.

The current client continues to render the displayed object until it leaves the scene, but as far as the message handling process of FIG. 23 is concerned, the current client simply waits at a step 950 for an incoming message defining the next occasion on which the displayed object will enter the scene rendered by the current client.

Figure 24:
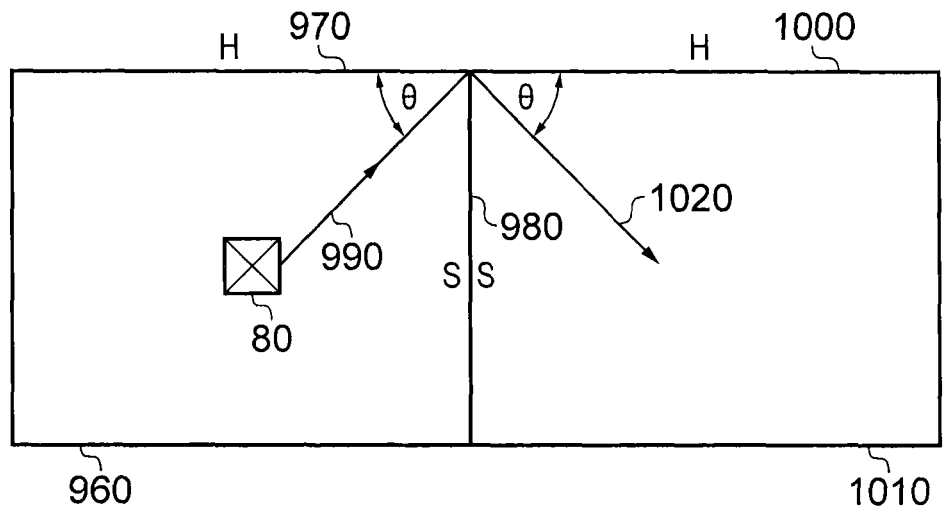
FIG. 24 schematically illustrates an object meeting a hard and a soft edge substantially simultaneously.

FIG. 24 schematically illustrates the displayed object 80 traversing a first scene 960 and substantially simultaneously meeting both a hard edge 970 and a soft edge 980, or in other words, intersecting at a corner of the scene. Note that in exemplary embodiments, corners are not defined as such—only edges are defined. These techniques define example ways of dealing with a path that could potentially intersect two edges.

In the example shown in FIG. 24, the path 990 of the displayed object 80 intersects with the corner of the first scene 960. So this is a special case of handling the process steps described above; if the path 990 passed just to the right of the corner, the path would transit through the soft edge 980 and the reflection would take place at the upper hard edge 1000 of the next scene 1010. Similarly, if the path 990 met the hard edge 970 just to the left of the corner, a reflection would take place and the path would transit through the soft edge 980. But if the path 990 hits the corner exactly, this must be handled so as to provide a sensible outcome, which in this case is a reflection along a path 1020 such that the angle of incidence to the upper edge of the canvas is the same as the angle of reflection.

This outcome can be obtained in various different ways. One example is to include a "corner detection" step into the steps of FIG. 22 or 23 so as to derive the new path 1020 in instances where the displayed object hits an exact corner between a hard and a soft edge. Another option is to deal with components of the motion of the displayed object which are relevant to the orientation of the edge which is being intersected, so that a horizontal component of motion is reversed when the displayed object meets a hard vertical edge but remains unaltered when the displayed object meets a soft vertical edge, and a vertical component of motion is reversed when the object meets a hard horizontal edge but remains unaltered when the object meets a soft horizontal edge.

Figure 25:
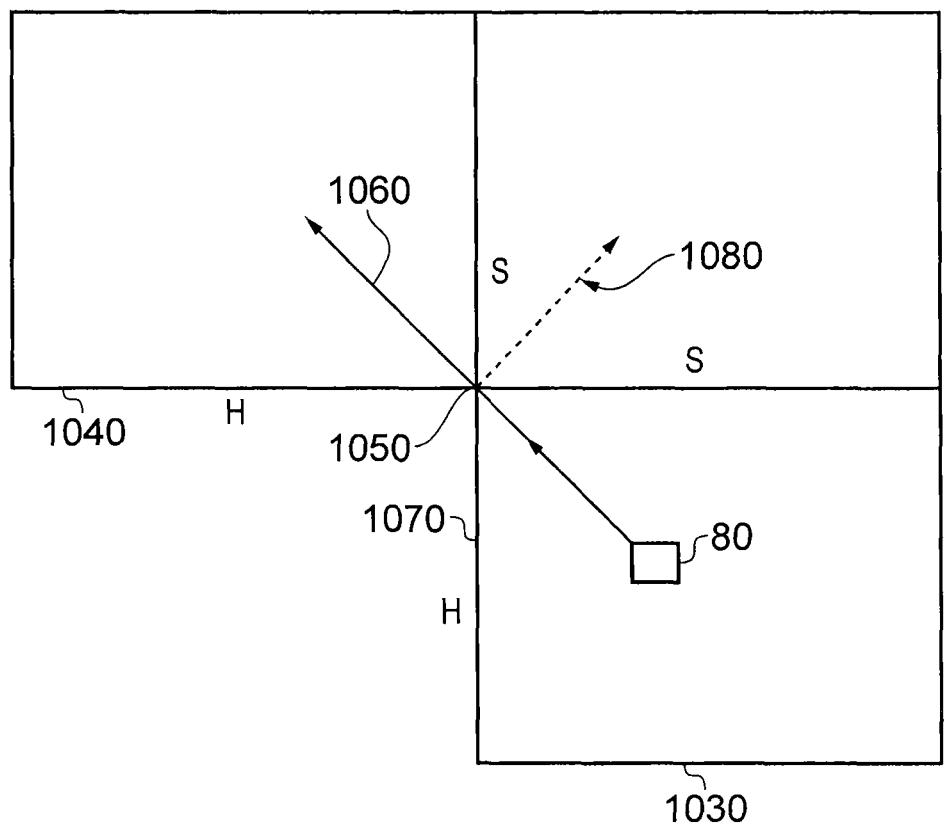
FIG. 25 schematically illustrates an object meeting a corner boundary between two scenes.

FIG. 25 schematically illustrates a further special case, in a more complicated canvas such that an object meets a corner boundary between two diagonally adjacent scenes 1030, 1040.

Here, in the instance that the object directly intersects with the corner 1050, there are two possible reasonable outcomes: one is that the object continues on its previous path along a path 1060. The other is that the object is reflected, as though from the left-hand hard edge 1070 along a reflection path 1080. In the special case of this type of diagonally adjacent scene and an object exactly intersecting the corner 1050, the choice between these two outcomes can be predetermined (for example) by convention.

As mentioned above, at least some of the clients connected to the network 60 may have user interface controls which are operable by the user. These can be used to alter the path, position, speed or direction of motion of the displayed object 80 and/or to alter the rendered appearance of the displayed object 80. Note that this feature applies to the client-server or the client-client arrangements described in the present application.

Figure 26:
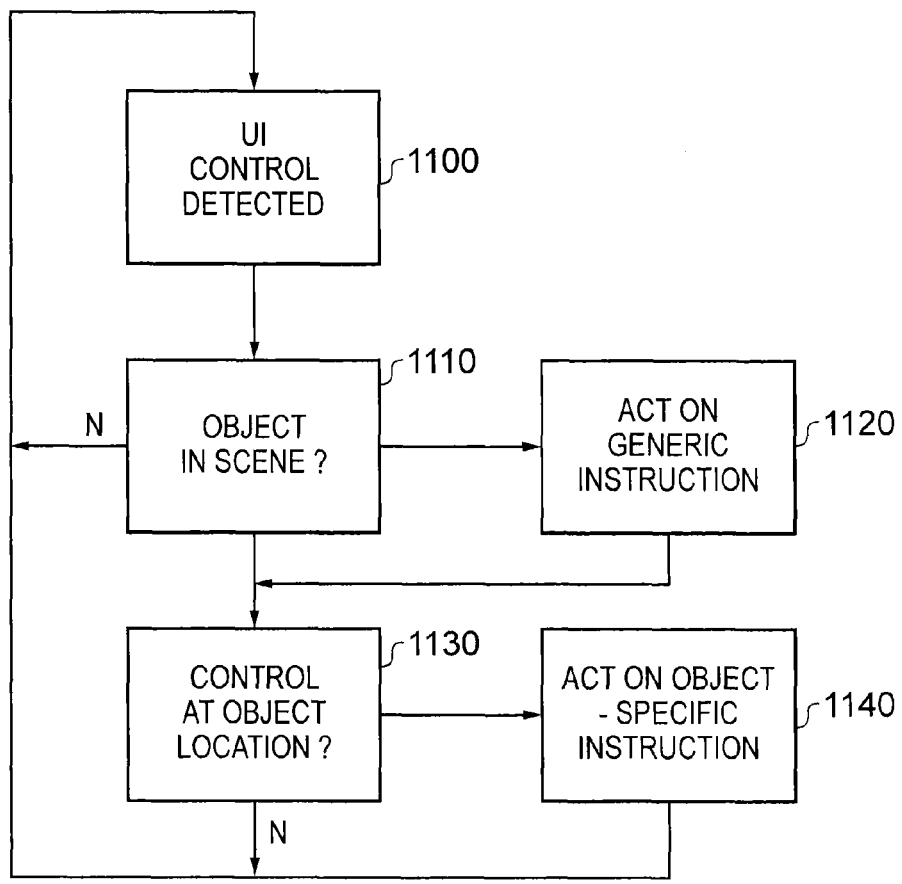
FIG. 26 schematically illustrates the interaction of a client device's user interface (UI) with an object currently displayed by that client.

A set of steps relevant to this process is shown in FIG. 26. Referring to FIG. 26, at a step 1100, the operation (by a user) of a user interface control is detected at a particular client.

Although it is possible to allow the operation of a user interface control at one client to affect a displayed object currently displayed by another client, this is not the way in which the present embodiments operate. Instead, at a step 1110 a first detection is made as to whether the displayed object is currently within the scene being displayed by that client. If not, no action is taken over the detected user interface control (or at least, no action relevant to the movement or rendering of the currently displayed object 80) and control returns to the step 1100 to await the next user interface control operation.

On the other hand, if the object is currently displayed in the scene handled by this client, then there are two types of operation considered here which are relevant to the currently displayed object. A first type of operation will be referred to as a "generic" instruction. Here, the concept represented by the word "generic" is that the user interface instruction to be acted upon does not refer to a particular location of the currently displayed object within the scene. So, examples of operations referred to here as being generic instructions include:

change the colour of the displayed object
    substitute or augment the displayed object with a photograph, such as a photograph taken in response to the user interface command by a camera forming part of the current client
    display certain wording or other information as part of the displayed object
    pause the displayed object's motion
    initiate a new random path for the displayed object starting from its current position in the scene All of these operations can be initiated irrespective of the current position of the displayed object within the scene handled by the current client. Such operations are executed at a step 1120 in FIG. 26. Execution of the operation, in a client-server system, may involve the current client sending an "intent" message to the server indicating changes to the appearance and/or motion of the object, if appropriate according to the motion path of the object. This message is then propagated to other clients by the task queue system described above.

In this type of interactive system, it is useful to achieve a relatively low latency in communications between the server and the clients, for example a few milliseconds. It is also useful to carry out the regular polling operations more frequently than in a non-interactive system. A typical period over which the human psycho-visual struggles to detect rendering errors is 100 ms, so if a polling period (a predetermined period which lies between successive occurrences of the client computer receiving path data) of around 100 ms is used, any changes to the motion of the displayed object which are relevant to adjacent scenes can be propagated in time to avoid a subjectively disturbing display error from the point of view of the user. Also, with regard to avoiding subjective disturbance to the viewer, in embodiments of the disclosure any changes to the motion of the displayed object are introduced over a predetermined delay period such as 100 ms or 200 ms (at least the period between successive path data). For example, if the object's motion is paused as a result of a user interface command, rather than stopping instantaneously the object is slowed steadily (or steadily but after an initial delay during which it is not decelerated) from its current speed to a zero speed over the course of the predetermined delay period mentioned above. A similar steady change can be applied in the case of a direction alteration, so that instead of an abrupt turn to the new direction the object is steadily turned over the course of the predetermined period.

Other user interface commands are however relevant to the object's current location within the scene. An example here is relevant to a client having a touchscreen; if the user touches the touchscreen at a point which overlaps (or, in embodiments of the disclosure, is within a threshold distance of) the currently displayed position of the object, this could provide the user with control over the motion of the object. For example, the user could pause and hold the object and then apply a "flick" motion with the finger (a rapid motion in a particular direction while retaining contact with the touchscreen) to send the object on a new path within the canvas. However, if the user touches the screen away from the currently displayed object, such a control would not be executed. So, at a step 1130, a detection is made as to whether a control has been executed using the user interface at the location of the object, possibly including the tolerance or threshold distance mentioned above. If not, then control is returned to the step 1100. However, if a user interface operation has been made at the object's current location, then that instruction is acted upon at a step 1140.

The tolerance or threshold distance away from the object, within which a touch by the user is detected as a touch of the object, does not need to be uniform around the object. The tolerance can be greater along the direction of motion of the object than perpendicular to the direction of motion. As a further alternative, the tolerance can be greater in a direction opposite to the current motion of the object than in other directions, so allowing the user to touch "where the object was" in case the user has slow reactions.

FIG. 27 schematically illustrates an example of a display location-specific user interface control. In the schematically depicted example of FIG. 27, the displayed object 80 is carrying out a transit between a first scene 1150 and a second scene 1160, by crossing the soft edge boundary between the two scenes. The scene 1160 is rendered by a client which includes a touchscreen interface. So, the user can touch the location on the scene 1160 with the user's finger 1170. At the step 1140 described above, this user interface operation is acted upon according to the convention established with that system, which in this example is that the object is paused in its motion by the user's touch. As discussed above, the object might not be paused instantaneously but could instead slow down linearly or nonlinearly over, say, 200 ms. This is particularly relevant in this example, because at the time that the user touches the object a part of the object is displayed by the scene 1150 and another part by the scene 1160. There is a delay of at least the polling period for a message to reach the client controlling the scene 1150, so even if the client for the scene 1160 stops the object straightaway, the part of the object being displayed by the scene 1150 would carry on moving for at least another 100 ms. Accordingly, instead of an instantaneous halt, the object is slowed over the predetermined period mentioned above.

The systems described above have operated with respect to a two-dimensional canvas formed of multiple two-dimensional scenes. An alternative arrangement will now be described which operates in three dimensions.

In order to operate with a third dimension (depth) a technique is required to represent depth on a display. There are two basic ways of achieving this. One is to use a so-called 3-D display in which separate respective images are sent to each of the user's eyes. 3-D display techniques are known, and technology for splitting the two images includes polarisation-based separation, time-based separation (using technology such as alternate shutter glasses for the user to wear) and colour-based separation in which the user views the images through different respective colour filters for each eye. By varying the apparent parallax between the pairs of images, a simulation of depth can be displayed. Using this technology, apparent depth behind and in front of the plane of the display screen can be simulated. The other basic way of representing depth is to use a two-dimensional display but to vary the image size of the object being displayed, so that it is displayed with a larger size to represent a depth position in front of the plane of the screen and a smaller size to represent a depth position behind the plane of the screen.

Figure 28A:
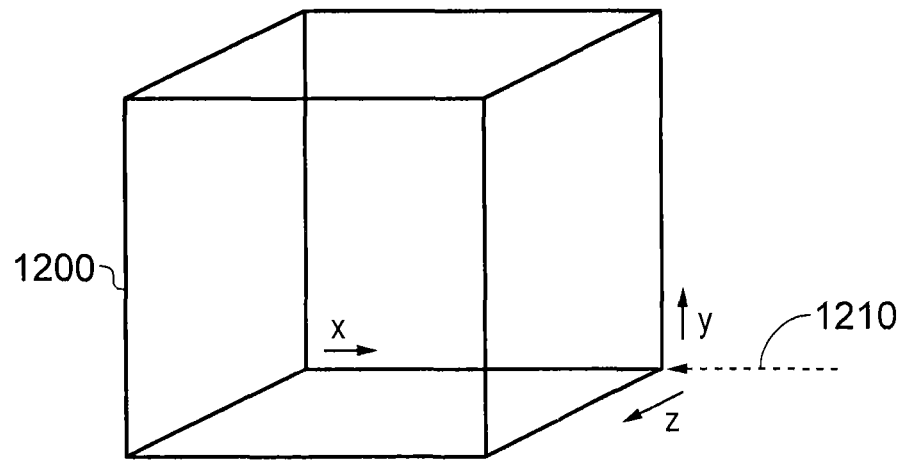
FIGS. 28A-28C schematically illustrate three-dimensional portions of a three-dimensional canvas.
Figure 28B:
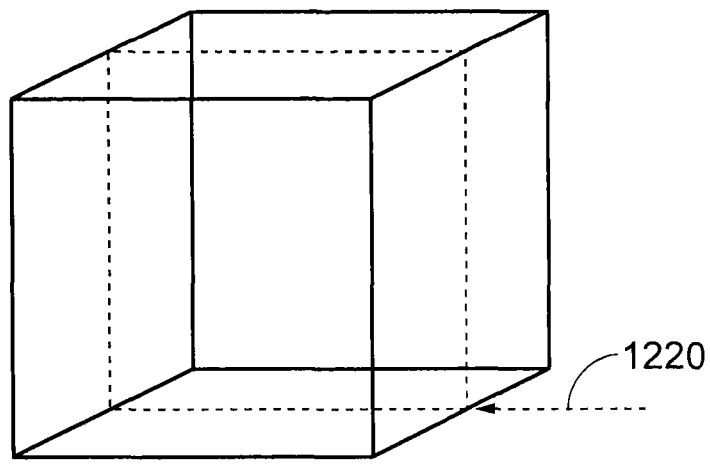
Figure 28C:
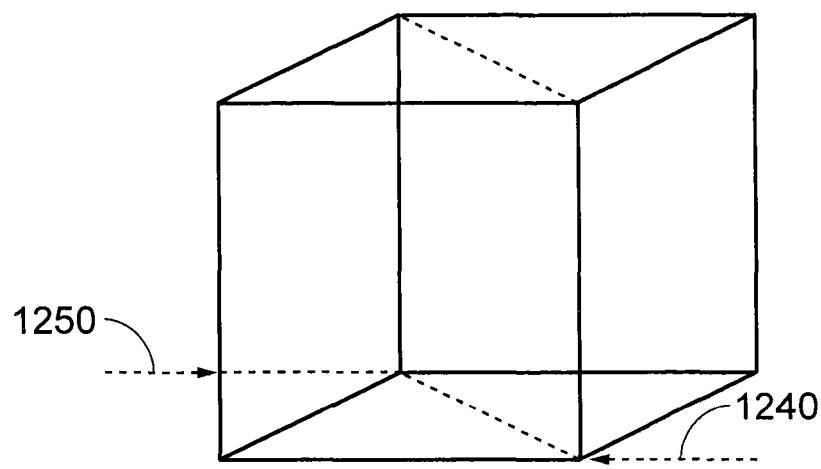

If a three-dimensional approach is used, it is possible to define a three-dimensional canvas and, within such a canvas, to define three-dimensional scenes as the contributions from each display within the overall system. FIGS. 28A-29C schematically illustrate possible three-dimensional scenes. In the examples of FIGS. 28A and 28B, the scene is represented as a cuboid shape 1200 in a virtual space, with the lateral (side-to-side, up and down) extent of the cuboid corresponding to the lateral extent of the display screen used to display that scene. The extent of the cuboid in the depth direction is a matter for the system designer to establish. In the notation of FIGS. 28A-28C, the z direction represents depth and points from the upper right to lower left of the isometric projection used to represent the cuboids. A depth position towards the upper right of the z axis represents a depth which is far away from the viewer, and a depth position towards the lower left of the z-axis represents a depth position closer to the viewer.

Within the respective scenes, it is possible to choose a depth position for the plane of the screen. In the example of FIG. 28A, a depth position 1210 at the rear of the cuboid-shaped scene has been chosen, so that representations of the moving object 80 (which can now represent a three-dimensional object) are provided on or in front of the plane of the screen. In FIG. 28B, the plane of the screen lies at a depth position at neither the front nor the back of the cuboid-shaped scene, so that depths behind and in front of the plane of the screen can be represented within the overall three-dimensional canvas. FIG. 28C represents a rather different option, noting that when working in three dimensions, the display screens on which the scenes are displayed do not necessarily need to lie in the same plane; in this example a display screen has been set so that it lies along an oblique plane 1230 with respect to depth, ranging from a front position 1240 to a rear depth position 1250.

Figure 29:
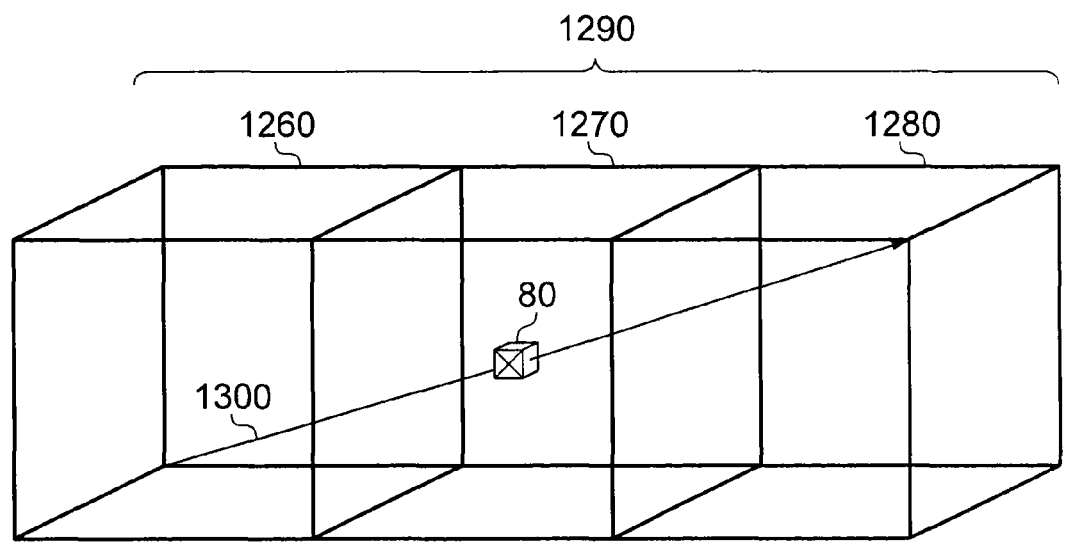
FIG. 29 schematically illustrates three display portions positioned adjacent to one another to form a three-dimensional canvas.

FIG. 29 schematically illustrates three such 3-D scenes 1260, 1270, 1280 arranged adjacent to one another so as to form a 3-D canvas 1290. An example path 1300 of a moving displayed object through the 3-D canvas 1290 has the object changing in depth as well as changing in the X and Y directions during its reversal of the canvas.

In the context of a 3-D canvas, rather than defining hard and soft edges it is appropriate to define hard and soft faces of the individual 3-D scenes. In the example shown in FIG. 29, the outermost faces of the canvas are treated as hard faces from which the moving object 80 will be reflected, whereas the faces by which one scene abuts another scene are treated as soft faces through which the moving object 80 will pass. When the object 80 does reach a hard face, a reflection according to the normal (simulated) laws of physics can take place.

Figure 30:
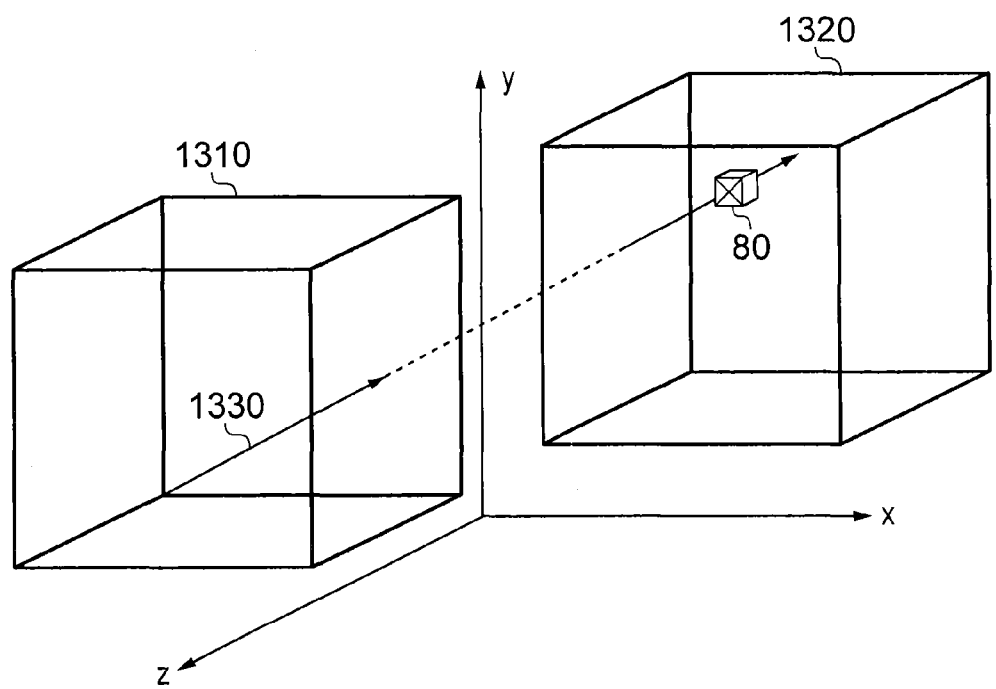
FIG. 30 schematically illustrates two display portions positioned non-adjacent to one another, to form a three-dimensional canvas.

FIG. 30 schematically illustrates two 3-D scenes 1310, 1320 which are positioned non-adjacent to one another but which, together, form a 3-D canvas. A displayed object 80 is shown following a path 1330 in three-dimensional space which passes out of the scene 1310 through a soft face and into the scene 1320, also through a soft face.

The calculations and server/client operations required to implement the three-dimensional system correspond to those employed in the two-dimensional system described above.

The actual display screens used to represent the three-dimensional scenes can be 3-D displays or 2-D displays. As described above, in a 3-D display, the conventional 3-D display technology can be used to represent simulated depth. In a 2-D display, depth can be represented by simply a change in display size of the object. In this way, a mixture of 2-D and 3-D displays can be employed. In a customer-demonstration system, this would have the particular advantage of showing the customer the added value obtained through purchasing a 3-D display.

Figure 31:
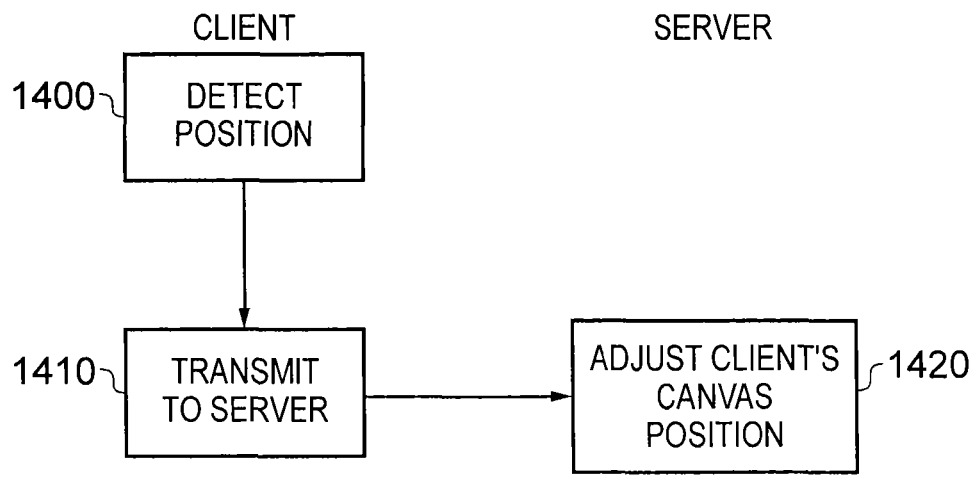
FIG. 31 schematically illustrates a process for position detection at a client device in a client-server system.

FIG. 31 schematically illustrates a process for position detection at a client device in a client-server system. As mentioned above, at least some of the clients may be equipped with a location detector (300, FIG. 11) which can detect an absolute position or changes in position of the client. If an absolute position is detectable, this can be used in place of the scene position information which may be transmitted to the server as part of the initial registration of the clients, as described above. Instead, position information can be transmitted to the server by means of messages such as intent messages, so that any changes in position of a client can be reflected in a change of the corresponding virtual position of that client's scene within the overall canvas. If only changes in position are detectable at high resolution (a resolution of less than the physical size of the display screen so maybe a few centimeters) then the initial registration can take place as described above with an initial position, and then changes can be transmitted to the server to allow modifications from that initial position.

So, referring to FIG. 31, at a step 1400, the client device detects its position or change in position. At a step 1410 that position or change in position is transmitted to the server, and at a step 1420 the server makes a corresponding adjustment to the virtual position of that client's scene within the overall canvas. The process of FIG. 31 repeats whenever a new position or a change in position is detected. This arrangement allows one or more of the client devices to be physically moved around, but for the multiscreen animation to continue based on the current physical positions of the client devices.

Figure 32:
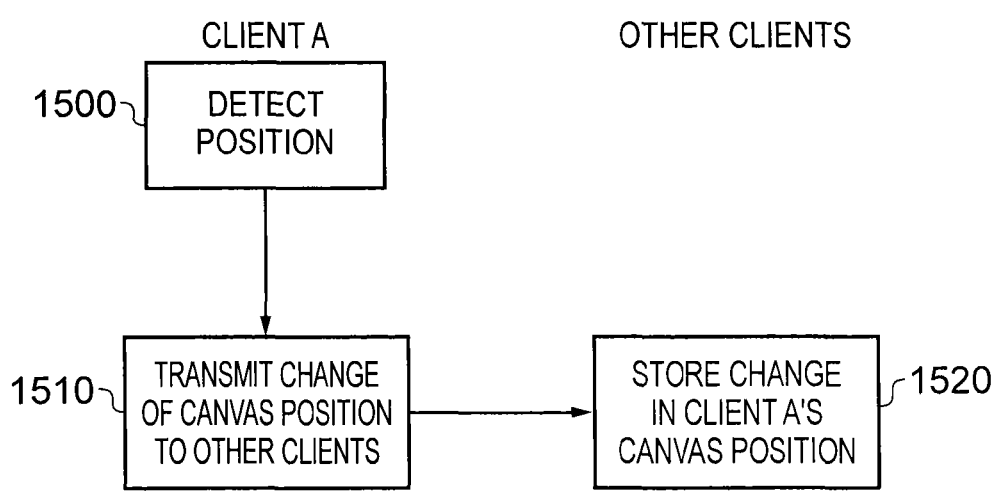
FIG. 32 schematically illustrates a process for position detection at a client device in a peer-to-peer system.

FIG. 32 schematically illustrates a similar process but for use in a peer-to-peer system. At a step 1500 a client device detects its position or a change in its position. At a step 1510 the client device converts that new position or change in position to a change in the virtual position within the canvas of the scene handled by that client and transmits it to other clients (as well as storing it itself) and at a step 1520 the other client devices store the change in that client's canvas position for use in subsequent path calculations.

Figure 33:
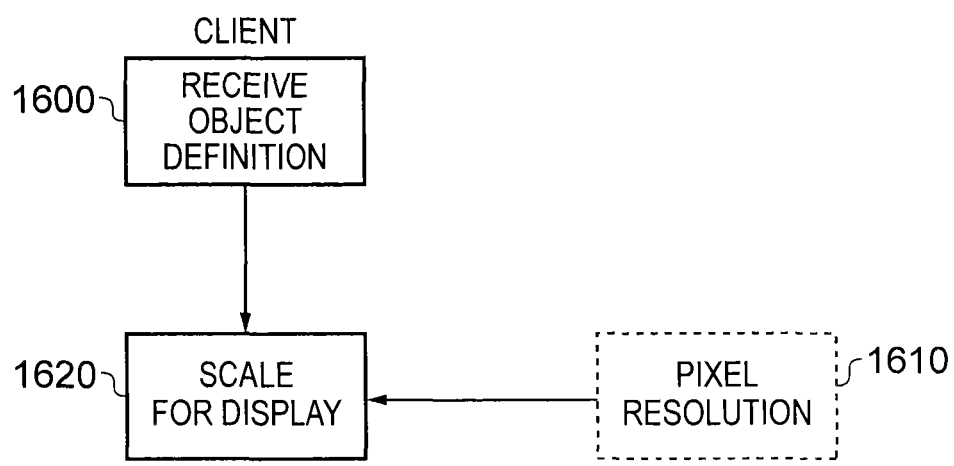
FIG. 33 schematically illustrates an object scaling process.

FIG. 33 schematically illustrates an object scaling process. Referring back to FIG. 2, in the example system shown, the various physical display screens used to represent the different scenes have different respective sizes. It is also likely that they will have different respective pixel resolutions. But it is desirable that the displayed object 80 appears to have the same real (physical) size whichever device it is displayed on.

Accordingly, in FIG. 33, when a client is first instructed by the server or requested by another client to display an object 80, it receives a definition of that object from the server or from the other client at a step 1600. With reference to a stored value 1610 indicative of the pixel resolution of the current client, the client scales the object according to the pixel display resolution of that client computer device at a step 1620 so as to display it at a required physical size, in order that the object is displayed at a consistent physical size amongst the client computer devices.

In the embodiments described above, various features are implemented by data processing apparatus or computers running appropriate software. It will be appreciated that such software, method steps implemented by such software or as part of a corresponding process, along with a providing medium such as a storage medium by which such software is provided are considered as embodiments of the present disclosure. An example of an appropriate storage medium is a non-transitory machine-readable storage medium such as a magnetic or optical disc medium or a non-volatile memory medium such as a flash memory.

CROSS-REFERENCE TO RELATED APPLICATIONS

The present application claims priority of EP patent application No. 12 159 994.8 filed on 16 Mar. 2012, the entire contents of which are incorporated herein by reference.

The invention claimed is:

1. A display system for displaying a moving object traversing a virtual display region, the system comprising:
   a group of two or more client networked computer devices each being configured to display a respective portion of the virtual display region, in which each respective portion is defined by a set of edges, each edge being classified as a hard edge, from which the moving object is reflected, or a soft edge through which the moving object is allowed to pass, the system being configured to redefine whether an edge of at least one of the portions is a hard or a soft edge independently of a change in number or relative positions of the respective portions of the virtual display region; and
   circuitry, associated with each client computer device, configured for defining a path of the moving object with respect to the portion of the virtual display region which is displayed by that client computer device;

the circuitry being configured, when the circuitry defines a path which intersects a soft edge of that client computer device's portion of the virtual display region, to transmit data defining the path of the moving object for use at least by another client computer device which displays the next portion of the virtual display region which will lie within the detected path of the moving object.

2. A system according to claim 1, the system being operable in response to a change in the number or relative configuration of client computer devices forming the group of devices, to redefine whether said edge of said at least one of the portions is a hard or a soft edge.

3. A system according to claim 1, the system being operable, in response to a data processing operation being carried out at a client computer device, to redefine a soft edge of at least that portion displayed by that client computer device as hard edge.

4. A system according to claim 1, in which the client computer devices are operable:
to establish a shared reference time;
to define the path data with reference to the shared reference time; and
to render the moving object according to the shared reference time.

5. A system according to claim 4, comprising a server computer device operable to define the shared reference time.

6. A system according to claim 5, in which:
a client computer device is operable to detect a difference between an internal time at that client computer device and the shared reference time at the server by transmitting a message to the server;
the server is operable to send the message back to the client computer device; and
the client computer device is operable to detect the transit time for the message and to detect the time, at the server according to the shared reference time, when the message was sent back to the client computer device.

7. A system according to claim 5, in which:
the server computer device is operable to maintain data defining the size and relative position of each portion within the virtual display region;
the client computer devices are operable to transmit the path data to the server computer device; and
the server computer device is operable to detect, from the path data, which client computer device displays the next portion of the virtual display region which will lie within the detected path of the moving object and to provide path data to the next client computer device to initiate rendering of the moving object by that next client computer device.

8. A system according to claim 7, in which the server computer device is operable to receive the path data from a client computer device according to a coordinate system local to the transmitting client computer device and to translate the path data into the coordinate system local to the next client computer device for provision to that next client computer device.

9. A system according to claim 7, in which:
the server computer device is operable to maintain a queue of tasks for each client computer device, and to add path data for a next client computer device to the queue for that device; and
each client computer device is operable to poll the server to request data defining any tasks held in the queue for that client computer device.

10. A system according to claim 1, in which each client computer device is operable to scale the image of the object according to the pixel display resolution of that client computer device, so that the object is displayed at a consistent physical size amongst the client computer devices.

11. A system according to claim 1, in which at least one of the client computer devices comprises a user control which, when operated by a user while the moving object is currently displayed by that client computer device, is operable to cause that client computer device to alter one or more of the rendered appearance, the position, the speed and the direction of motion of the moving object.

12. A system according to claim 11, in which, when the user control is operated to change the speed or direction of motion of the moving object, the client computer device is operable to apply a delay period before fully implementing the required change in speed or direction.

13. A system according to claim 12,
in which, for each client computer device, at least a predetermined period lies between successive occurrences of that client computer receiving path data; and
in which the delay period is greater than or equal to the predetermined period.

14. A system according to claim 1, in which the virtual display region is a three-dimensional display region, and at least one of the client computer devices comprises a three-dimensional display for displaying a respective portion of the virtual display region.

15. A client computer device for use in a display system for displaying a moving object traversing a virtual display region and having two or more client computer devices each being configured to display a respective portion of the virtual display region, in which each respective portion is defined by a set of edges, each edge being classified as a hard edge, from which the moving object is reflected, or a soft edge through which the moving object is allowed to pass, the system being configured to redefine whether an edge of at least one of the portions is a hard or a soft edge independently of a change in number or relative positions of the respective portions of the virtual display region;
the client computer device comprising:
circuitry, associated with each client computer device, configured for defining a path of the moving object with respect to the portion of the virtual display region which is displayed by that client computer device;
the circuitry being configured, when the circuitry defines a path which intersects a soft edge of that client computer device's portion of the virtual display region, to transmit data defining the path of the moving object for use at least by another client computer device which displays the next portion of the virtual display region which will lie within the detected path of the moving object;
the circuitry being further configured to send a message to the system to redefine a soft edge of at least that portion displayed by that client computer device as a hard edge independently of the change in number or relative positions of the respective portions of the virtual display region.

16. A method of displaying a moving object traversing a virtual display region using two or more client computer devices each being configured to display a respective portion of the virtual display region, in which each respective portion is defined by a set of edges, each edge being classified as a hard edge, from which the moving object is reflected, or a soft edge through which the moving object is allowed to pass, the method comprising:

each client computer device defining a path of the moving object with respect to the portion of the virtual display region which is displayed by that client computer device;

when a path is defined which intersects a soft edge of that client computer device's portion of the virtual display region, transmitting data defining the path of the moving object for use at least by another client computer device which displays the next portion of the virtual display region which will lie within the detected path of the moving object; and providing functionality to redefine whether an edge of at least one of the portions is a hard or a soft edge independently of a change in number or relative positions of the respective portions of the virtual display region.

* * * * *